United States Patent
Kaneoya et al.

(10) Patent No.: US 9,120,968 B2
(45) Date of Patent: Sep. 1, 2015

(54) LIQUID CRYSTAL DISPLAY DEVICE

(71) Applicant: DIC CORPORATION, Tokyo (JP)

(72) Inventors: Masakazu Kaneoya, Kitaadachi-gun (JP); Kiyofumi Kateuchi, Kitaadachi-gun (JP); Seiji Funakura, Kamisu (JP); Katsunori Shimada, Sakura (JP)

(73) Assignee: DIC CORPORATION, Tokyo (JP)

( * ) Notice: Subject to any disclaimer, the term of this patent is extended or adjusted under 35 U.S.C. 154(b) by 0 days.

(21) Appl. No.: 14/350,227

(22) PCT Filed: Jul. 18, 2013

(86) PCT No.: PCT/JP2013/069519
§ 371 (c)(1),
(2) Date: Apr. 7, 2014

(87) PCT Pub. No.: WO2014/034314
PCT Pub. Date: Mar. 6, 2014

(65) Prior Publication Data
US 2015/0124205 A1 May 7, 2015

(30) Foreign Application Priority Data
Jul. 25, 2012 (JP) .................................. 2012-164814

(51) Int. Cl.
*C09K 19/30* (2006.01)
*C09K 19/42* (2006.01)
(Continued)

(52) U.S. Cl.
CPC ......... *C09K 19/3066* (2013.01); *C09K 19/3068* (2013.01); *C09K 19/322* (2013.01);
(Continued)

(58) Field of Classification Search
CPC ...... C09K 19/20; C09K 19/42; C09K 19/322; C09K 2019/3003; C09K 2019/3004; C09K 2019/3009; C09K 2019/122; C09K 2019/123; C09K 2019/3028; C09K 2019/3078; C09K 2019/0446; C09K 2019/0448; C09K 2019/301; C09K 2019/3016; C09K 2019/3021; C09K 2019/3036; C09K 2019/3037; C09K 2019/304; C09K 2019/3066; C09K 2019/3068; C09K 2019/3075; C09K 2019/3425; G02B 5/201; G02F 1/133514; G02F 1/133512
See application file for complete search history.

(56) References Cited

U.S. PATENT DOCUMENTS 8,860,912 B2 * 10/2014 Kaneoya et al. ............... 349/108
8,885,124 B2 * 11/2014 Kaneoya et al. ............... 349/108
2012/0236246 A1    9/2012 Furusato et al.

FOREIGN PATENT DOCUMENTS

JP    2000-019321 A    1/2000
(Continued)

OTHER PUBLICATIONS

International Search Report for PCT/JP2013/069519, Mailing Date of Aug. 20, 2013.
(Continued)

*Primary Examiner* — Shean C Wu
(74) *Attorney, Agent, or Firm* — Westerman, Hattori, Daniels & Adrian, LLP

(57) ABSTRACT

The present invention provides a liquid crystal display device that allows a reduction in a voltage holding ratio (VHR) of a liquid crystal layer and an increase in an ion density (ID) in the liquid crystal layer to be suppressed and thereby addresses issues of faulty display such as white missing pixels, alignment inconsistencies, and burn-in. The liquid crystal display device according to the present invention, having a feature of suppressing the reduction in a voltage holding ratio (VHR) and the increase in an ion density (ID) in a liquid crystal layer and thereby suppressing occurrence of faulty display such as burn-in, is particularly useful as VA-mode and PSVA-mode liquid crystal display devices for active-matrix driving and may be used for liquid crystal display devices such as a liquid crystal TV, a monitor, a mobile phone, and a smart phone.

16 Claims, 1 Drawing Sheet

(51) Int. Cl.
  *G02B 5/20* (2006.01)
  *C09K 19/32* (2006.01)
  *C09K 19/58* (2006.01)
  *G02F 1/1335* (2006.01)
  *C09K 19/04* (2006.01)
  *C09K 19/12* (2006.01)
  *C09K 19/34* (2006.01)
  *C09K 19/52* (2006.01)

(52) U.S. Cl.
  CPC ............ *C09K19/3402* (2013.01); *C09K 19/42* (2013.01); *C09K 19/582* (2013.01); *G02B 5/20* (2013.01); *G02F 1/133512* (2013.01); *G02F 1/133514* (2013.01); *G02F 1/133516* (2013.01); *C09K 2019/0407* (2013.01); *C09K 2019/0448* (2013.01); *C09K 2019/0466* (2013.01); *C09K 2019/122* (2013.01); *C09K 2019/123* (2013.01); *C09K 2019/301* (2013.01); *C09K 2019/3009* (2013.01); *C09K 2019/3016* (2013.01); *C09K 2019/3021* (2013.01); *C09K 2019/3027* (2013.01); *C09K 2019/3036* (2013.01); *C09K 2019/3037* (2013.01); *C09K 2019/3425* (2013.01); *C09K 2019/523* (2013.01)

(56) References Cited

FOREIGN PATENT DOCUMENTS

| | | |
|---|---|---|
| JP | 2000-192040 A | 7/2000 |
| JP | 2005-281559 A | 10/2005 |
| JP | 2009-058546 A | 3/2009 |
| JP | 2009-109542 A | 5/2009 |
| JP | 2010-250117 A | 11/2010 |
| WO | 2011/092973 A1 | 8/2011 |

OTHER PUBLICATIONS

Decision to Grand a Patent for Japanese Application 2013-542280, Mailing Date of Oct. 29, 2013.

* cited by examiner

LIQUID CRYSTAL DISPLAY DEVICE

TECHNICAL FIELD

The present invention relates to a liquid crystal display device.

BACKGROUND ART

Recently, liquid crystal display devices have been widely used in clocks, electronic calculators, various home appliances, measuring equipment, panels for automobiles, word processors, electronic personal organizers, printers, computers, TVs, and the like. Typical examples of the types of liquid crystal display include a TN (twisted nematic)-mode display, a SIN (super-twisted nematic)-mode display, a DS (dynamic light scattering)-mode display, a GH (guest-host)-mode display, an IPS (in-plane switching)-mode display, an OCB (optically compensated birefringence)-mode display, an ECB (electrically controlled birefringence)-mode display, a VA (vertical alignment)-mode display, a CSH (color super-homeotropic)-mode display, and a FLC (ferroelectric liquid crystal) display. There has been a shift in the driving method used from a conventional static driving to a multiplex driving, which has been commonly employed. Recently, passive-matrix LCDs and active-matrix (AM) LCDs, which are driven using a TFT (thin-film transistor), a TFD (thin-film diode), or the like, have been widely employed.

As shown in FIG. 1, a common liquid crystal display device includes two substrates (1) each including an alignment film (4); a transparent electrode layer (3a) serving as a common electrode and a color filter layer (2), which are interposed between one of the alignment film and the corresponding substrate; and a pixel electrode layer (3b) interposed between the other alignment film and the corresponding substrate. These substrates are arranged so that the alignment films face each other, and a liquid crystal layer (5) is held therebetween.

The color filter layer is constituted by a black matrix, a red-colored layer (B), a green-colored layer (G), a blue-colored layer (B), and, as needed, a yellow-colored layer (Y).

The amount of impurities in a liquid crystal material constituting the liquid crystal layer is strictly controlled because any impurities remaining in the liquid crystal material would greatly affect the electrical characteristics of the display device. It is known that a material constituting the alignment film also affects the electrical characteristics of the liquid crystal layer because any impurities remaining in the alignment film would migrate into the liquid crystal layer due to the direct contact of the alignment film with the liquid crystal layer. Thus, the characteristics of the liquid crystal display device due to impurities contained in an alignment film material is currently being studied.

On the other hand, a material of the color filter layer, such as an organic pigment, as well as an alignment film material, is also considered to affect the liquid crystal layer due to impurities contained therein. However, the direct effect of a material of the color filter layer on the liquid crystal layer has been considered to be very small compared with the effect of the alignment film material since the alignment film and the transparent electrode are interposed between the color filter layer and the liquid crystal layer. However, the thickness of the alignment film is generally 0.1 μm or less, and the thickness of the transparent electrode, which is a common electrode disposed on the color-filter-layer-side, is generally 0.5 μm or less even in the case where the thickness of the transparent electrode is set large in order to increase electric conductivity. Therefore, it cannot be said that the color filter layer and the liquid crystal layer are in an environment where they are completely isolated from each other, and the impurities contained in the color filter layer, which migrate via an alignment film and a transparent electrode, may cause a reduction in a voltage holding ratio (VHR) of a liquid crystal layer and an increase in the ion density (ID) in the liquid crystal layer, which results in faulty display such as white missing pixels, alignment inconsistencies, and burn-in.

In order to address the faulty display caused by impurities contained in pigments constituting the color filter, a method (PTL 1) of controlling elution of the impurities into a liquid crystal by using a pigment such that the proportion of a substance extracted from the pigment with ethyl formate is set to be equal to or less than a specific value and a method (PTL 2) of controlling elution of the impurities into a liquid crystal by specifying a pigment contained in a blue colored layer have been studied. However, there is not a great difference between these methods and a method of simply reducing the amount of impurities contained in a pigment, and these methods provide unsatisfactory improvements in addressing the faulty display in the present situation in which progress has been made in purification techniques for pigments.

On the other hand, focusing on the relationship between organic impurities contained in the color filter and the liquid crystal composition, a method in which the degree of difficulty in dissolving the organic impurities in the liquid crystal layer is represented as a hydrophobicity parameter of liquid crystal molecules contained in the liquid crystal layer and the hydrophobicity parameter is controlled to be equal to or more than a predetermined value has been disclosed. Furthermore, based on the correlation between the hydrophobicity parameter and a —$OCF_3$ group at the end of the liquid crystal molecule, a method (PTL 3) of preparing a liquid crystal composition including a certain proportion of a liquid crystal compound having a —$OCF_3$ group at the end of the liquid crystal molecule has been disclosed.

However, the essence of the invention disclosed in the cited document is reducing the effect of impurities contained in a pigment on the liquid crystal layer and there was no study on the direct relationship between the structure of a coloring material, such as a dye or a pigment, used for a color filter and the structure of a liquid crystal material. Thus, the issue of faulty display of liquid crystal display devices, which are becoming more advanced, has not yet been addressed.

CITATION LIST

Patent Literature

PTL 1: Japanese Unexamined Patent Application Publication No. 2000-19321

PTL 2: Japanese Unexamined Patent Application Publication No. 2009-109542

PTL 3: Japanese Unexamined Patent Application Publication No. 2000-192040

SUMMARY OF INVENTION

Technical Problem

The present invention provides a liquid crystal display device that is produced using a specific liquid crystal composition and a color filter including specific pigments and thereby allows a reduction in the voltage holding ratio (VHR) of a liquid crystal layer and an increase in the ion density (ID) in the liquid crystal layer to be suppressed, which addresses issues of faulty display such as white missing pixels, alignment inconsistencies, and burn-in.

Solution to Problem

In order to address the above-described issues, the inventors of the present invention have conducted extensive studies on the combination of a coloring material, such as a dye or a pigment, constituting the color filter and the structure of a liquid crystal material constituting the liquid crystal layer. As a result, the inventors have found that a liquid crystal display device that includes a liquid crystal material having a specific structure and that includes a color filter prepared using specific pigments allows a reduction in the voltage holding ratio (VHR) of a liquid crystal layer and an increase in the ion density (ID) in the liquid crystal layer to be suppressed and thereby the issues of faulty display such as white missing pixels, alignment inconsistencies, and burn-in are addressed. Thus, the present invention has been completed.

Specifically, the present invention provides a liquid crystal display device including a first substrate, a second substrate, a liquid crystal composition layer held between the first substrate and the second substrate, a color filter including a black matrix and an RGB three-color pixel portion, a pixel electrode, and a common electrode. The liquid crystal composition layer is composed of a liquid crystal composition including one or more compounds selected from the compound group represented by General Formula (LC1) to General Formula (LC4) below:

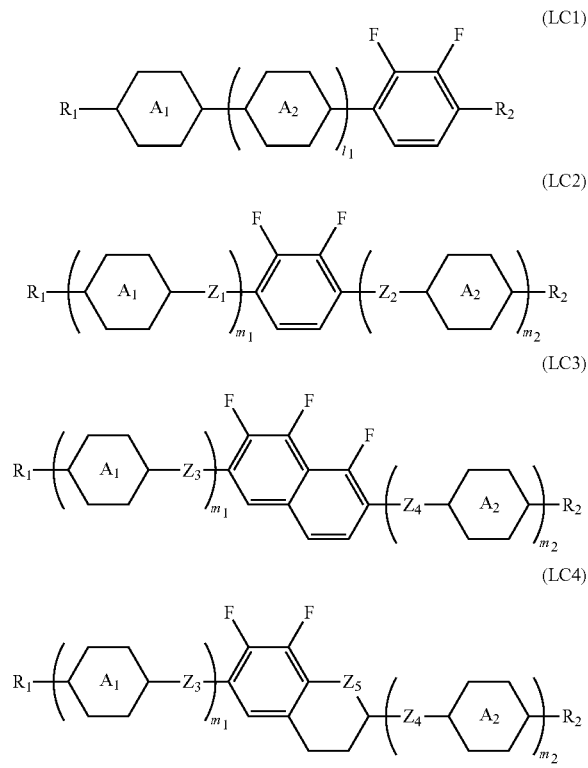

(where $R_1$ and $R_2$ each independently represent an alkyl group having a carbon number of 1 to 15; one or more $CH_2$ groups of the alkyl group may be substituted by —O—, —CH=CH—, —CO—, —OCO—, —COO—, —C≡C—, —$CF_2O$—, or —$OCF_2$— so that an oxygen atom is not directly adjacent to another oxygen atom; one or more hydrogen atoms of the alkyl group may optionally be substituted by a halogen; $A_1$ and $A_2$ each independently represent any one of the following structures:

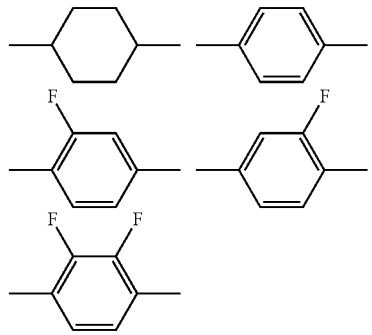

(in these structures, one or more $CH_2$ groups of the cyclohexane ring may be substituted by an oxygen atom, one or more CH groups of the benzene ring may be substituted by a nitrogen atom, and one or more hydrogen atoms may be substituted by F, Cl, $CF_3$, or $OCF_3$); $Z_1$ to $Z_4$ each independently represent a single bond, —CH=CH—, —C≡C—, —$CH_2CH_2$—, —$(CH_2)_4$—, —COO—, —$OCH_2$—, —$CH_2O$—, —$OCF_2$—, or —$CF_2O$—; $Z_5$ represents a $CH_2$ group or an oxygen atom; at least one of $Z_1$ and $Z_2$ is not a single bond; $l_1$ represents 0 or 1; $m_1$ and $m_2$ each independently represent 0 to 3; and $m_1+m_2$ is 1, 2, or 3). In the RGB three-color pixel portion, an R pixel portion includes, as a coloring material, a diketopyrrolopyrrole-based red pigment having an average primary particle size of 5 to 50 nm as measured by small angle X-ray scattering.

Advantageous Effects of Invention

The liquid crystal display device according to the present invention, which includes a specific liquid crystal composition and a color filter including specific pigments, allows a reduction in the voltage holding ratio (VHR) and an increase in the ion density (ID) in a liquid crystal layer to be suppressed, and thereby the occurrence of faulty display such as white missing pixels, alignment inconsistencies, and burn-in is suppressed.

REFERENCE SIGNS LIST

Figure 1:
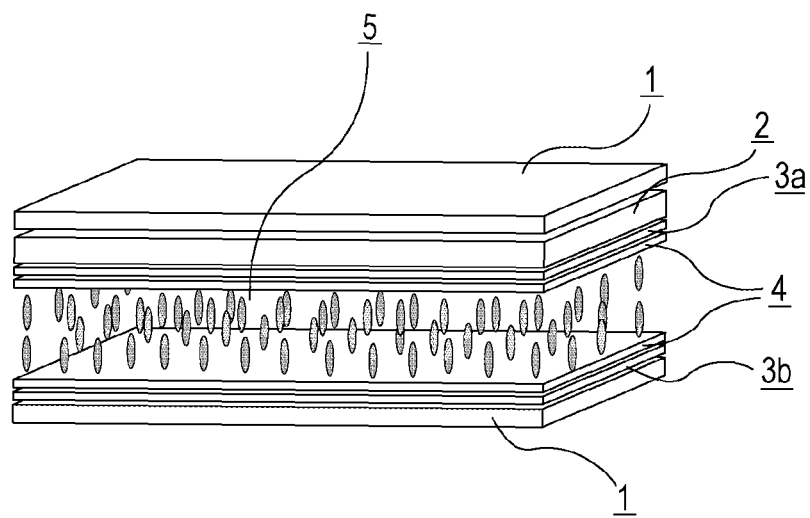
FIG. 1 is a diagram illustrating an example of a conventional, common liquid crystal display device.

1 substrate
2 color filter layer
2a color filter layer including specific pigments
3a transparent electrode layer (common electrode)
3b pixel electrode layer
4 alignment film
5 liquid crystal layer
5a liquid crystal layer including a specific liquid crystal composition

DESCRIPTION OF EMBODIMENTS

Figure 2:
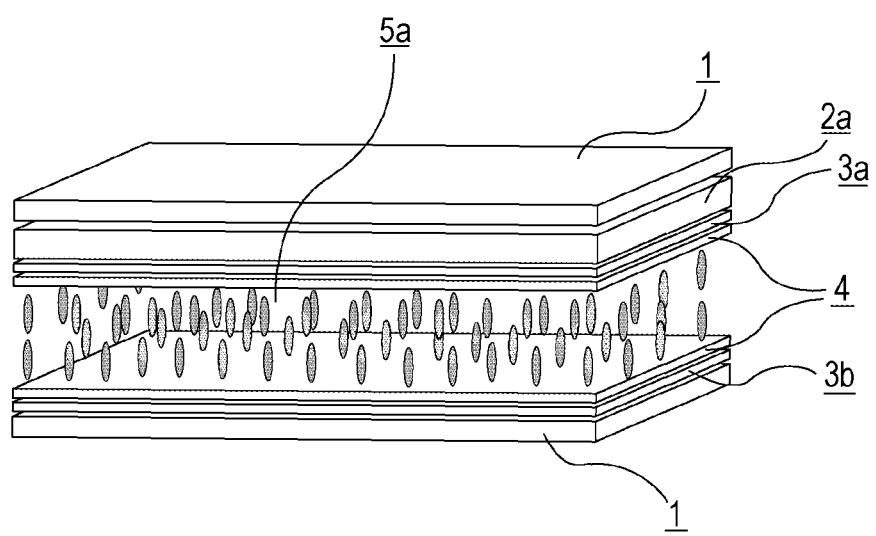
FIG. 2 is a diagram illustrating an example of the liquid crystal display device according to the present invention.

FIG. 2 shows an example of the liquid crystal display device according to the present invention, which includes two substrates (1), namely, a first substrate and a second substrate, each including an alignment film (4); a transparent electrode layer (3a) serving as a common electrode and a color filter layer (2a) including specific pigments, which are interposed between one of the alignment film and the corresponding substrate; and a pixel electrode layer (3b) interposed between the other alignment film and the corresponding substrate. These substrates are arranged so that the alignment films face each other, and a liquid crystal layer (5a) including a specific liquid crystal composition is held therebetween.

The two substrates of the display device are bonded together using a sealant and an encapsulant disposed in the periphery of the substrates. In many cases, granular spacers or resin spacer pillars formed by photolithography are disposed between the substrates in order to maintain a distance between substrates.

(Liquid Crystal Layer)

The liquid crystal layer of the liquid crystal display device according to the present invention is composed of a liquid crystal composition including one or more compounds selected from the compound group represented by General Formula (LC1) to General Formula (LC4) below:

[Chem. 3]

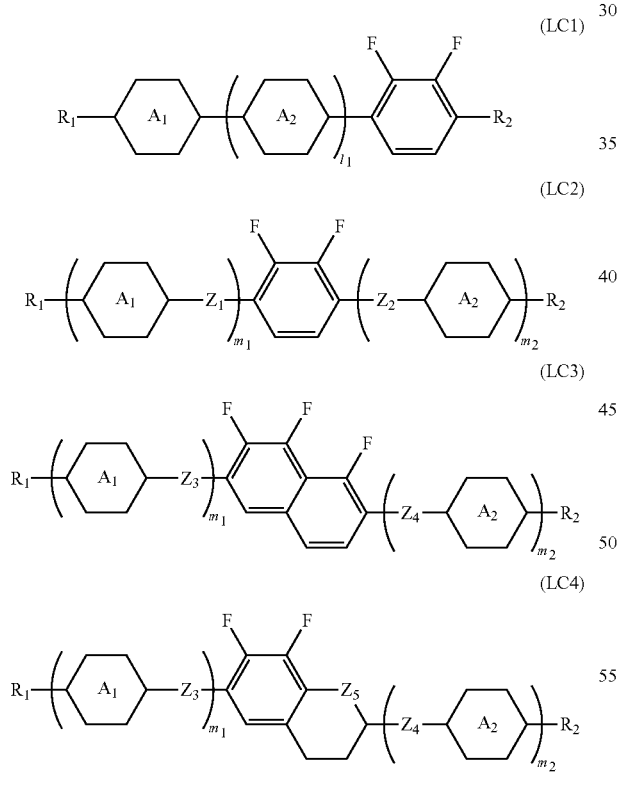

(in General Formula (LC1) to General Formula (LC4), $R_1$ and $R_2$ each independently represent an alkyl group having a carbon number of 1 to 15; one or more $CH_2$ groups of the alkyl group may be substituted by —O—, —CH=CH—, —CO—, —OCO—, —COO—, —C≡C—, —CF$_2$O—, or —OCF$_2$— so that an oxygen atom is not directly adjacent to another oxygen atom; one or more hydrogen atoms of the alkyl group may optionally be substituted by a halogen; $A_1$ and $A_2$ each independently represent any one of the following structures:

[Chem. 4]

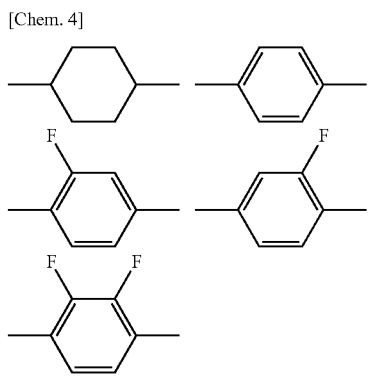

(in these structures, one or more $CH_2$ groups of the cyclohexane ring may be substituted by an oxygen atom, one or more CH groups of the benzene ring may be substituted by a nitrogen atom, and one or more hydrogen atoms may be substituted by F, Cl, $CF_3$, or $OCF_3$); $Z_1$ to $Z_4$ each independently represent a single bond, —CH=CH—, —C≡C—, —CH$_2$CH$_2$—, —(CH$_2$)$_4$—, —COO—, —OCH$_2$—, —CH$_2$O—, —OCF$_2$—, or —CF$_2$O—; $Z_5$ represents a $CH_2$ group or an oxygen atom; at least one of $Z_1$ and $Z_2$ is not a single bond; $l_1$ represents 0 or 1; $m_1$ and $m_2$ each independently represent 0 to 3; and $m_1$+$m_2$ is 1, 2, or 3). $R_1$ and $R_2$ are preferably each independently an alkyl group having a carbon number of 1 to 7, an alkoxy group having a carbon number of 1 to 7, or an alkenyl group having a carbon number of 2 to 7.

$A_1$ and $A_2$ are preferably each independently any one of the following structures:

[Chem. 5]

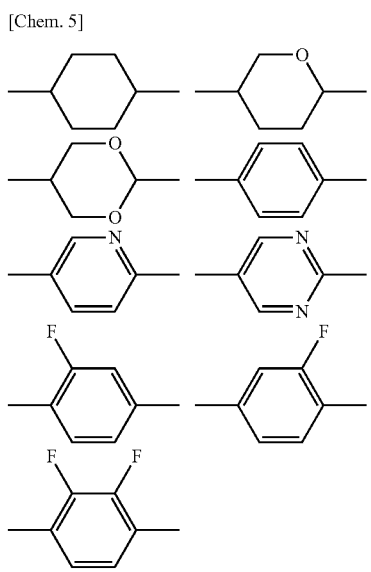

$Z_1$ to $Z_4$ are preferably each independently a single bond, —CH$_2$CH$_2$—, —COO—, —OCH$_2$—, —CH$_2$O—, —OCF$_2$—, or —CF$_2$O—.

The above-described liquid crystal composition preferably further includes one or more compounds represented by General Formula (LC5) below:

[Chem. 6]

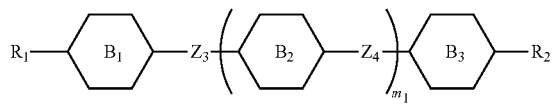
(LC5)

(in General Formula (LC5), $R_1$ and $R_2$ each independently represent an alkyl group having a carbon number of 1 to 15; one or more $CH_2$ groups of the alkyl group may be substituted by —O—, —CH=CH—, —CO—, —OCO—, —COO—, —C≡C—, —CF$_2$O—, or —OCF$_2$— so that an oxygen atom is not directly adjacent to another oxygen atom; one or more hydrogen atoms of the alkyl group may optionally be substituted by a halogen; $B_1$ to $B_3$ each independently represent any one of the following structures:

[Chem. 7]

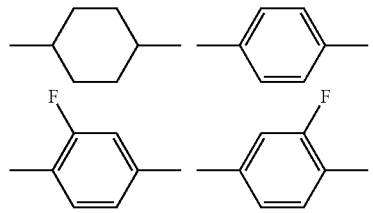

(in these structures, one or more $CH_2CH_2$ groups of the cyclohexane ring may be substituted by —CH=CH—, —CF$_2$O—, or —OCF$_2$— and one or more CH groups of the benzene ring may be substituted by a nitrogen atom); $Z_3$ and $Z_4$ each independently represent a single bond, —CH=CH—, —C≡C—, —CH$_2$CH$_2$—, —(CH$_2$)$_4$—, —COO—, —OCH$_2$—, —CH$_2$O—, —OCF$_2$—, or —CF$_2$O—; at least one of $Z_3$ and $Z_4$ is not a single bond; and $m_1$ represents 0 to 3).

$R_1$ and $R_2$ are preferably each independently an alkyl group having a carbon number of 1 to 7, an alkoxy group having a carbon number of 1 to 7, or an alkenyl group having a carbon number of 2 to 7.

$B_1$ to $B_3$ are preferably each independently any one of the following structures:

[Chem. 8]

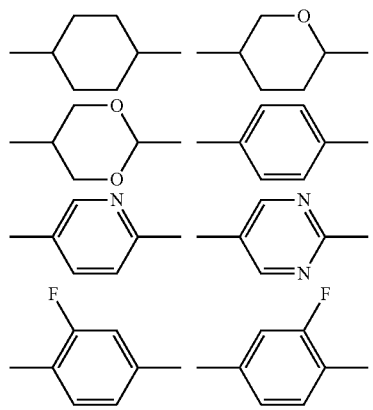

$Z_3$ and $Z_4$ are preferably each independently a single bond, —CH$_2$CH$_2$—, —COO—, —OCH$_2$—, —CH$_2$O—, —OCF$_2$—, or —CF$_2$O—.

General Formula (LC1) more preferably represents one or more compounds selected from the group consisting of the compounds represented by General Formula (LC1)-1 to General Formula (LC1)-7 below:

[Chem. 9]

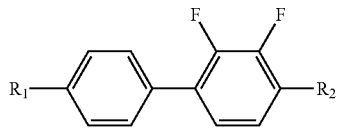
(LC1-1)

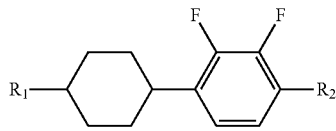
(LC1-2)

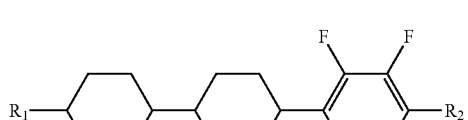
(LC1-3)

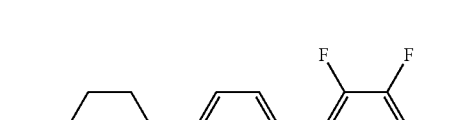
(LC1-4)

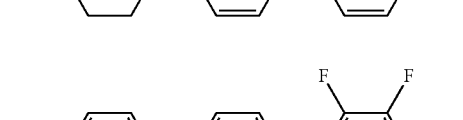
(LC1-5)

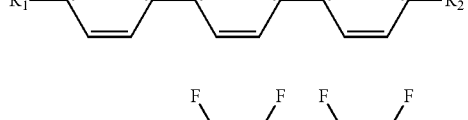
(LC1-6)

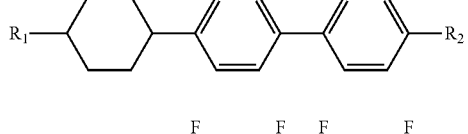
(LC1-7)

(in General Formula (LC1)-1 to General Formula (LC1)-7, $R_1$ and $R_2$ each independently represent an alkyl group having a carbon number of 1 to 7, an alkoxy group having a carbon number of 1 to 7, an alkenyl group having a carbon number of 2 to 7, or an alkenyloxy group having a carbon number of 2 to 7).

General Formula (LC2) more preferably represents one or more compounds selected from the group consisting of the compounds represented by General Formula (LC2)-1 to General Formula (LC2)-15 below:

[Chem. 10]

(LC2)-1
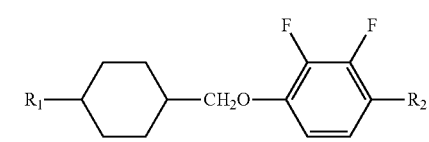

(LC2)-2
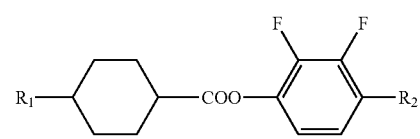

(LC2)-3
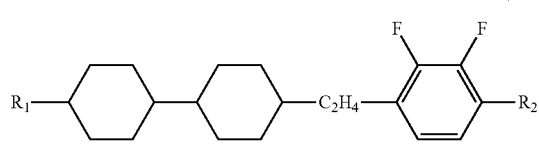

(LC2)-4
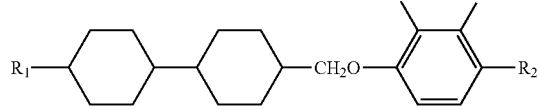

(LC2)-5
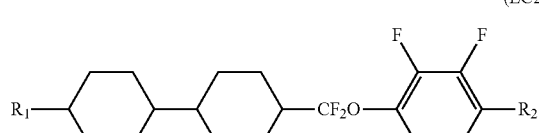

(LC2)-6
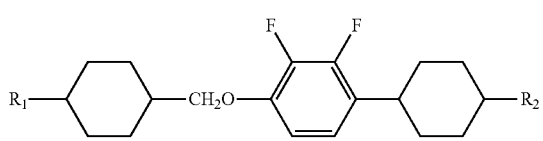

(LC2)-7
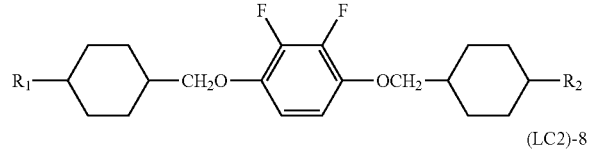

(LC2)-8
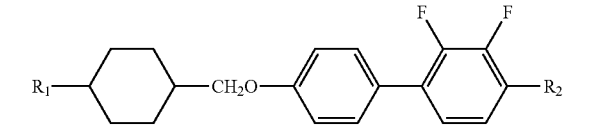

(LC2)-9
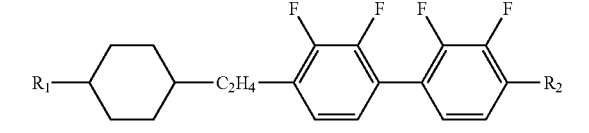

(LC2)-10
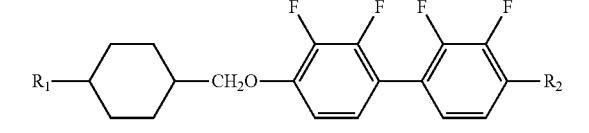

(LC2)-11
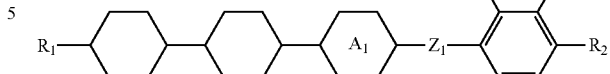

(LC2)-12

(LC2)-13
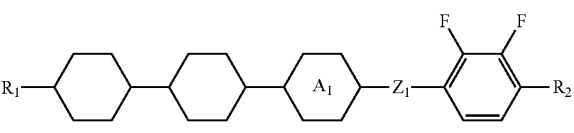

[Chem. 11]

(LC2-14)
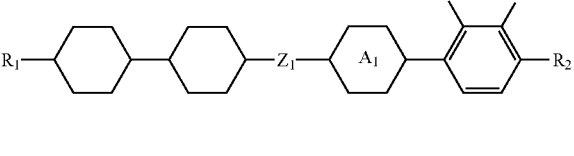

(LC2-15)
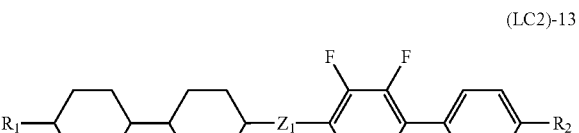

(in General Formula (LC2)-1 to General Formula (LC2)-15, $R_1$ and $R_2$ each independently represent an alkyl group having a carbon number of 1 to 7, an alkoxy group having a carbon number of 1 to 7, an alkenyl group having a carbon number of 2 to 7, or an alkenyloxy group having a carbon number of 2 to 7; $Z^1$ represents —$CH_2CH_2$—, —$OCH_2$—, —$CH_2O$—, —$OCF_2$—, or —$CF_2O$—; and $A^1$ represents any one of the following structures:

[Chem. 12]

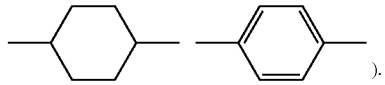

General Formula (LC3) more preferably represents one or more compounds selected from the group consisting of the compounds represented by General Formula (LC3)-1 to General Formula (LC3)-6. General Formula (LC4) more preferably represents one or more compounds selected from the group consisting of the compounds represented by General Formula (LC4)-1 to General Formula (LC4)-4 below:

[Chem. 13]

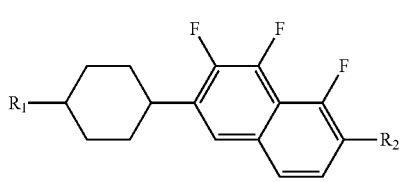
(LC3)-1

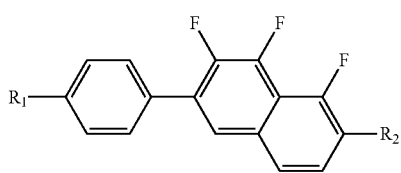
(LC3)-2

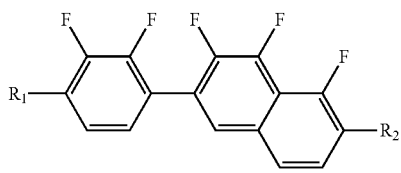
(LC3)-3

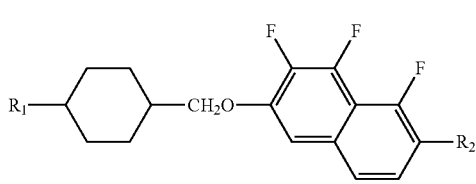
(LC3)-4

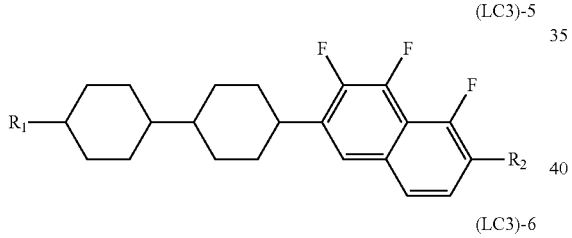
(LC3)-5

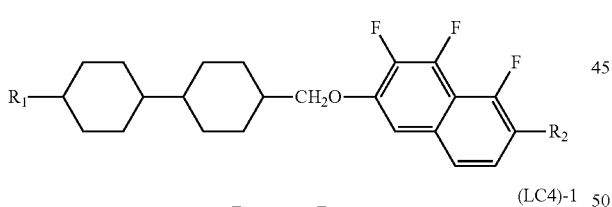
(LC3)-6

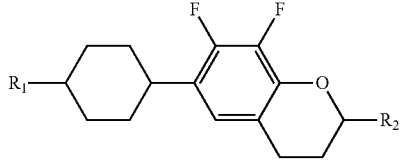
(LC4)-1

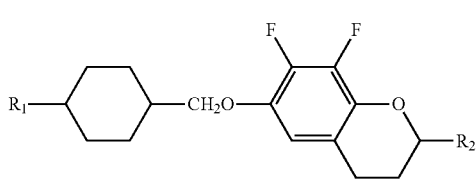
(LC4)-2

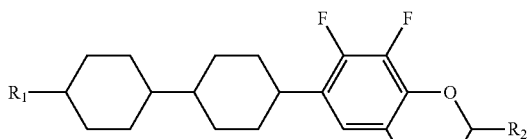
(LC4)-3

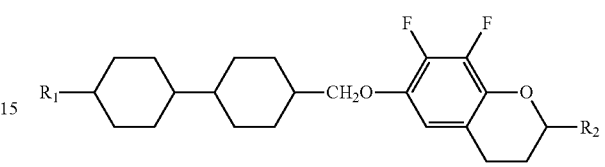
(LC4)-4

(in General Formula (LC3)-1 to General Formula (LC3)-6 and General Formula (LC4)-1 to General Formula (LC4)-4, $R_1$ and $R_2$ each independently represent an alkyl group having a carbon number of 1 to 7, an alkoxy group having a carbon number of 1 to 7, an alkenyl group having a carbon number of 2 to 7, or an alkenyloxy group having a carbon number of 2 to 7).

General Formula (LC5) more preferably represents one or more compounds selected from the group consisting of the compounds represented by General Formula (LC5)-1 to General Formula (LC5)-13 below:

[Chem. 14]

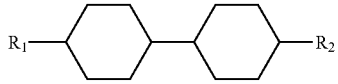
(LC5)-1

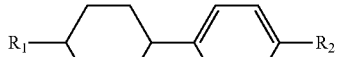
(LC5)-2

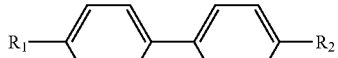
(LC5)-3

(LC5)-4

(LC5)-5

(LC5)-6

(LC5)-7

-continued

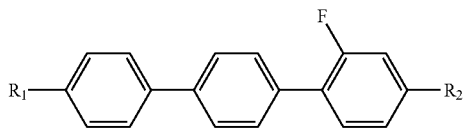
(LC5)-8

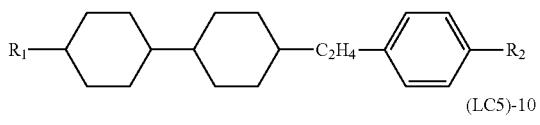
(LC5)-9

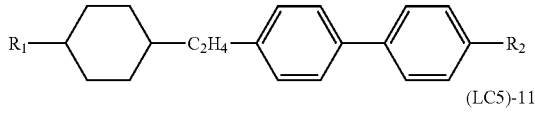
(LC5)-10

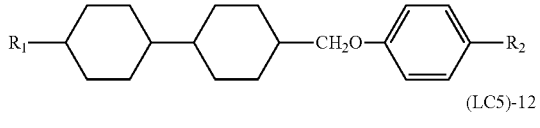
(LC5)-11

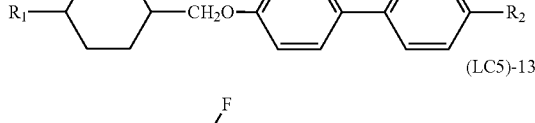
(LC5)-12

(LC5)-13

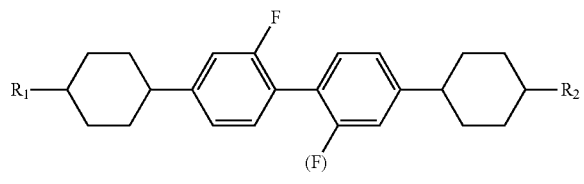

(in General Formula (LC5)-1 to General Formula (LC5)-13, $R_1$ and $R_2$ each independently represent an alkyl group having a carbon number of 1 to 7, an alkoxy group having a carbon number of 1 to 7, an alkenyl group having a carbon number of 2 to 7, or an alkenyloxy group having a carbon number of 2 to 7).

The above-described liquid crystal composition layer may include one or more polymerizable compounds. Specifically, the polymerizable compound represented by General Formula (PC1) below is preferable.

[Chem. 15]

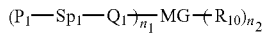
(PC1)

(in General Formula (PC1), $P_1$ represents a polymerizable functional group; $Sp_1$ represents a spacer group having a carbon number of 0 to 20; $Q_1$ represents a single bond, —O—, —NH—, —NHCOO—, —OCONH—, —CH=CH—, —CO—, —COO—, —OCO—, —OCOO—, —OOCO—, —CH=CH—, —CH=CH—COO—, —OCO—CH=CH—, or —C≡C—; $n_1$ and $n_2$ represent 1, 2, or 3; MG represents a mesogenic group or a mesogenic supporting group; $R_{10}$ represents a halogen atom, a cyano group, or an alkyl group having a carbon number of 1 to 25, and one or more $CH_2$ groups of the alkyl group may be substituted by —O—, —S—, —NH—, —N($CH_3$)—, —CO—, —COO—, —OCO—, —OCOO—, —SCO—, —COS—, or —C≡C— so that an oxygen atom is not directly adjacent to another oxygen atom; and, in another case, $R_{10}$ represents $P_2$-$Sp_2$-$Q_2$- (in this formula, $P_2$, $Sp_2$, $Q_2$ independently represent the same things as $P_1$, $Sp_1$, $Q_1$, respectively)).

In General Formula (PC1), MG more preferably has the following structure:

[Chem. 16]

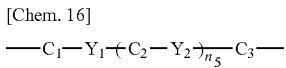

(in this formula, $C_1$ to $C_3$ each independently represent a 1,4-phenylene group, a 1,4-cyclohexylene group, a 1,4-cyclohexenyl group, a tetrahydropyran-2,5-diyl group, a 1,3-dioxane-2,5-diyl group, a tetrahydrothiopyran-2,5-diyl group, a 1,4-bicyclo(2,2,2)octylene group, a decahydronaphthalene-2,6-diyl group, a pyridine-2,5-diyl group, a pyrimidine-2,5-diyl group, a pyrazine-2,5-diyl group, a 1,2,3,4-tetrahydronaphthalene-2,6-diyl group, a 2,6-naphthylene group, a phenanthrene-2,7-diyl group, a 9,10-dihydrophenanthrene-2,7-diyl group, a 1,2,3,4,4a,9,10a-octahydrophenanthrene 2,7-diyl group, or a fluorene 2,7-diyl group; the 1,4-phenylene group, the 1,2,3,4-tetrahydronaphthalene-2,6-diyl group, the 2,6-naphthylene group, the phenanthrene-2,7-diyl group, the 9,10-dihydrophenanthrene-2,7-diyl group, the 1,2,3,4,4a,9,10a-octahydrophenanthrene 2,7-diyl group, and the fluorene 2,7-diyl group may include, as a substituent, one or more F atoms, Cl atoms, $CF_3$ groups, $OCF_3$ groups, cyano groups, alkyl groups having a carbon number of 1 to 8, alkoxy groups having a carbon number of 1 to 8, alkanoyl groups having a carbon number of 1 to 8, alkanoyloxy groups having a carbon number of 1 to 8, alkenyl groups having a carbon number of 2 to 8, alkenyloxy groups having a carbon number of 2 to 8, alkenoyl groups having a carbon number of 2 to 8, or alkenoyloxy groups having a carbon number of 2 to 8; $Y_1$ and $Y_2$ each independently represent —COO—, —OCO—, —$CH_2CH_2$—, —$OCH_2$—, —$CH_2O$—, —CH=CH—, —C≡C—, —CH=CHCOO—, —OCOCH=CH—, —$CH_2CH_2$COO—, —$CH_2CH_2$OCO—, —COO$CH_2CH_2$—, —OCO$CH_2CH_2$—, —CONH—, —NHCO—, or a single bond; and $n_5$ represents 0, 1, or 2). $Sp_1$ and $Sp_2$ more preferably each independently represent an alkylene group, which may include one or more halogen atoms or cyano groups as substituents. One or more $CH_2$ groups of the alkylene group may be substituted by —O—, —S—, —NH—, —N($CH_3$)—, —CO—, —COO—, —OCO—, —OCOO—, —SCO—, —COS—, or —C≡C— so that an oxygen atom is not directly adjacent to another oxygen atom. $P_1$ and $P_2$ more preferably each independently have any one of the structures represented by Formula (R-1) to Formula (R-15) below:

[Chem. 17]

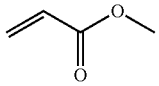
(R-1)

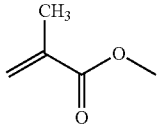
(R-2)

(R-11), and Formula (R-13) are more preferable. The polymerizable groups represented by Formula (R-1) and Formula (R-2) are more preferable.

An example of a polymerizable compound including one polymerizable functional group in its molecule is the compound represented by General Formula (PC1)-0 below:

[Chem. 18]

$$H_2C=\overset{R_{11}}{\underset{|}{C}}-COO-Y_0-\boxed{T_1}-Y_1-\boxed{T_2}-\left(Y_2-\boxed{T_3}\right)_{n4}-Y_3-R_{12} \quad (PC1)\text{-}0$$

(in Formula (PC1)-0, $R_{11}$ represents a hydrogen atom or a methyl group; the six-membered rings $T_1$, $T_2$, and $T_3$ each independently represent any one of the following structures:

[Chem. 19]

(where m represents an integer of 1 to 4);

$n_4$ represents an integer of 0 or 1;

$Y_0$, $Y_1$, and $Y_2$ each independently represent a single bond, —O—, —OCH$_2$—, —OCH$_2$—, —C$_2$H$_4$—, —COO—, —OCO—, —CH═CH—, —CO—, —OCOO—, —NH—, —NHCOO—, —OCONH—, —OCOCH$_2$—, —CH$_2$OCO—, —COOCH$_2$—, —CH$_2$COO—, —CH═CH—COO—, —OCO—CH═CH—, —CH═CH—OCO—, —COO—CH═CH—, —CH═CCH$_3$—COO—, —COO—CCH$_3$═CH—, —COOC$_2$H$_4$—, —OCOC$_2$H$_4$—, C$_2$H$_4$OCO—, —C$_2$H$_4$COO—, —C≡C—, —CF$_2$O—, or —OCF$_2$—;

$Y_3$ represents a single bond, —O—, —COO—, or —OCO—; and $R_{12}$ represents a hydrogen atom, a halogen atom, a cyano group, an alkyl group having a carbon number of 1 to 20, an alkenyl group having a carbon number of 1 to 20, an alkoxy group having a carbon number of 1 to 20, or a hydrocarbon group having a carbon number of 1 to 20). At least one polymerizable compound selected from the group consisting of these polymerizable compounds is preferably used.

Examples of a polymerizable compound including two or more polymerizable functional groups in its molecule include the compounds represented by General Formula (PC1)-1 and General Formula (PC1)-2 below:

[Chem. 20]

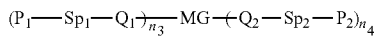
(PC1)-1

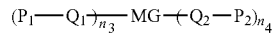
(PC1)-2

(in General Formula (PC1)-1 and General Formula (PC1)-2, $P_1$, $Sp_1$, $Q_1$, $P_2$, $Sp_2$, $Q_2$, and MG represent the same things as in General Formula (PC1) and $n_3$ and $n_4$ each independently represent 1, 2, or 3).

Specifically, General Formula (PC1) preferably represents one or more polymerizable compounds selected from the group consisting of the compounds represented by General Formula (PC1)-3 to General Formula (PC1)-11 below:

[Chem. 21]

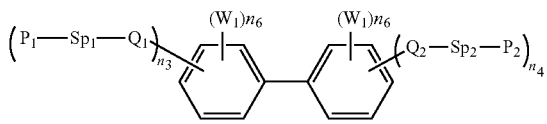
(PC1)-3

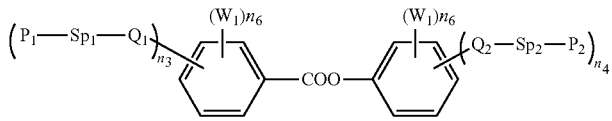
(PC1)-4

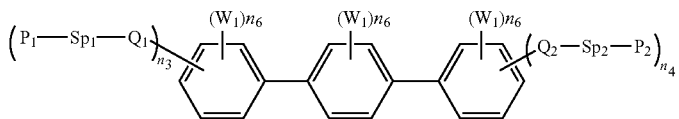
(PC1)-5

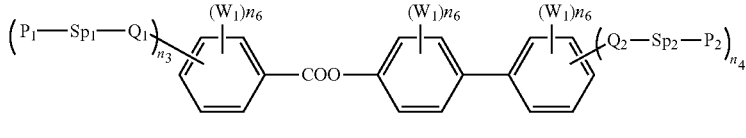
(PC1)-6

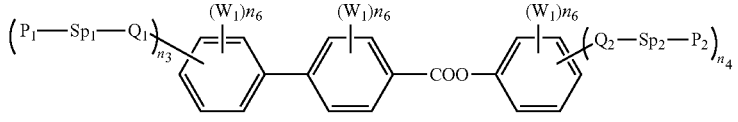
(PC1)-7

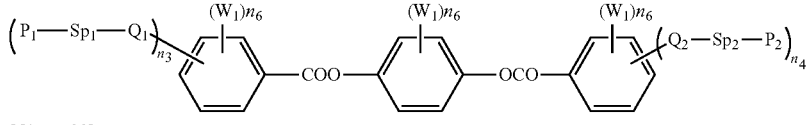
(PC1)-8

[Chem. 22]

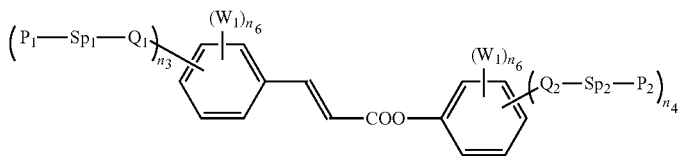
(PC1)-9

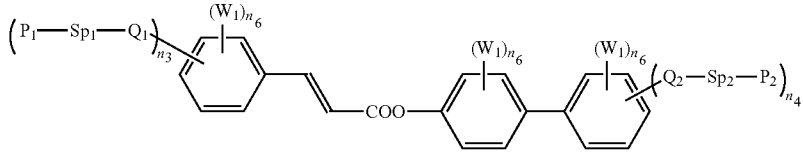
(PC1)-10

(PC1)-11

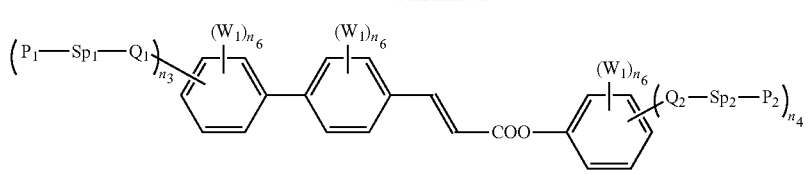

(in General Formula (PC1)-3 to General Formula (PC1)-11, $P_1$, $P_2$, $Sp_1$, $Sp_2$, $Q_1$, and $Q_2$ represent the same things as in General Formula (PC1); $W_1$'s each independently represent F, $CF_3$, $OCF_3$, $CH_3$, $OCH_3$, an alkyl group having a carbon number of 2 to 5, an alkoxy group having a carbon number of 2 to 5, an alkenyl group having a carbon number of 2 to 5, $COOW_2$, $OCOW_2$, or $OCOOW_2$ (in these formulae, $W_2$'s each independently represent a straight-chain or branched chain alkyl group having a carbon number of 1 to 10 or an alkenyl group having a carbon number of 2 to 5); $n_3$'s each independently represent 1, 2, or 3; $n_4$'s each independently represent 1, 2, or 3; $n_6$'s each independently represent 0, 1, 2, 3, or 4; and, in the same ring, $n_3+n_6$ and $n_4+n_6$ are 5 or less).

In General Formula (PC1) and General Formula (PC1)-1 to General Formula (PC1)-11, $Sp_1$, $Sp_2$, $Q_1$, and $Q_2$ are preferably a single bond. The value of $n_3+n_4$ is preferably 1 to 3 and is preferably 1 or 2. $P_1$ and $P_2$ are preferably the polymerizable group represented by Formula (R-1) or (R-2). $W_1$ is preferably F, $CF_3$, $OCF_3$, $CH_3$, or $OCH_3$. The value of $n_6$ is 1, 2, 3, or 4.

Specifically, the following compounds are preferable.

[Chem. 23]

(PC1-3a)

(PC1-3b)

(PC1-3c)

(PC1-3d)

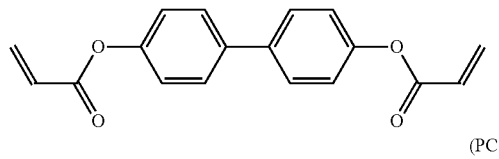

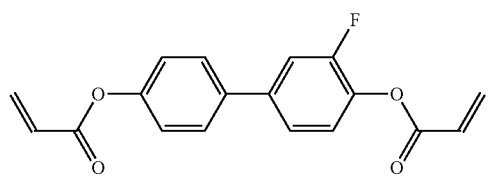

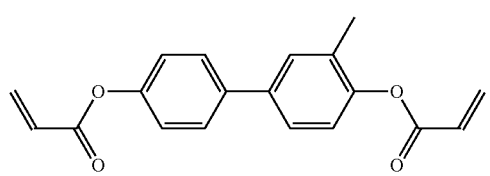

-continued (PC1-3e)

(PC1-3f)

(PC1-3g)

(PC1-3h)

(PC1-3i)

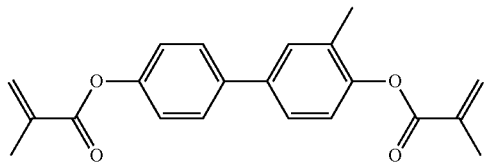

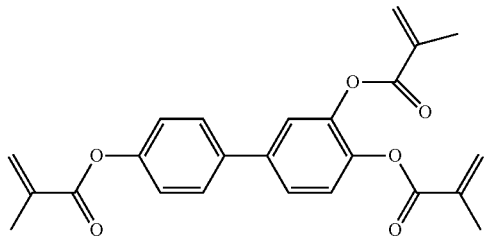

Furthermore, a hydrogen atom of benzene rings of (PC1-3a) to (PC1-3i) may be substituted by a fluorine atom.

It is also preferable that the polymerizable compound is the disc-shaped liquid crystal compound represented by General Formula (PC1)-9 below:

[Chem. 24]

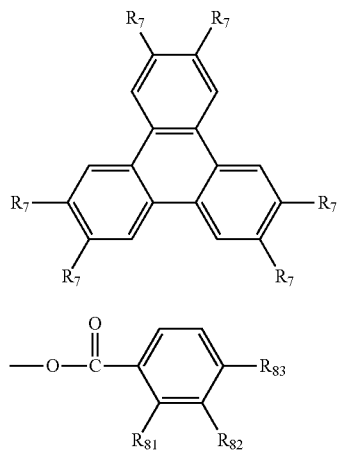

(in General Formula (PC1)-9, $R_7$'s each independently represent $P_1$-$Sp_1$-$Q_1$ or a substituent represented by General Formula (PC1-e). (in General Formula (PC1-e), $P_1$, $Sp_1$, and $Q_1$ represent the same things as in General Formula (PC1), $R_{81}$ and $R_{82}$ each independently represent a hydrogen atom, a halogen atom, or a methyl group, $R_{83}$ represents an alkoxy group having a carbon number of 1 to 20, and at least one hydrogen atom of the alkoxy group is substituted by any one of the substituents represented by Formula (R-1) to (R-15))).

The amount of polymerizable compound used is preferably 0.05% by mass to 2.0% by mass.

The above-described liquid crystal composition may be used alone for the above-described purpose or may contain one or more types of antioxidants. The liquid crystal composition may further contain one or more types of UV absorbents.

(Color Filter)

In the present invention, the color filter includes a black matrix and an RGB three-color pixel portion. In the RGB three-color pixel portion, an R pixel portion includes, as a coloring material, a diketopyrrolopyrrole-based red pigment having an average primary particle size of 5 to 50 nm as measured by small angle X-ray scattering.

(G Pixel Portion)

A G pixel portion preferably includes at least one pigment or dye selected from the group consisting of a halogenated metal phthalocyanine pigment, a phthalocyanine-based green dye, and a mixture of a phthalocyanine-based blue dye and an azo-based yellow organic dye. The halogenated metal phtalocynian pigment includes a metal selected from the group consisting of Al, Si, Sc, Ti, V, Mg, Fe, Co, Ni, Zn, Cu, Ga, Ge, Y, Zr, Nb, In, Sn, and Pb as a central metal. When the central metal is trivalent, the central metal is preferably bonded to any one of a halogen atom, a hydroxy group, and a sulfonic group or is preferably oxo-cross-linked or thio-cross-linked. When the central metal is a tetravalent metal, the central metal is preferably bonded to any one of an oxygen atom, two identical or different halogen atoms, two hydroxy groups, and two sulfonic groups. Examples of the halogenated metal phthalocyanine pigment include halogenated metal phthalocyanine pigments belonging to the following two groups.

(Group 1)

Halogenated metal phthalocyanine pigments including a metal selected from the group consisting of Al, Si, Sc, Ti, V, Mg, Fe, Co, Ni, Zn, Cu, Ga, Ge, Y, Zr, Nb, In, Sn, and Pb as a central metal, wherein 8 to 16 halogen atoms per phthalocyanine molecule are bonded to benzene rings of a phthalocyanine molecule, the central metal being bonded to any one of a halogen atom, a hydroxy group, and a sulfonic group (—$SO_3H$) when the central metal is trivalent or bonded to any one of an oxygen atom, two identical or different halogen atoms, two hydroxy groups, and two sulfonic groups when the central metal is a tetravalent metal.

(Group 2)

Pigments constituted by halogenated metal phthalocyanine dimers including a trivalent metal selected from the group consisting of Al, Sc, Ga, Y, and In as a central metal, the structural unit of the dimers being two halogenated metal phthalocyanine molecules including 8 to 16 halogen atoms per phthalocyanine molecule bonded to benzene rings of the phthalocyanine molecule, the central metals of the structural unit being bonded to each other via a divalent atomic group selected from the group consisting of an oxygen atom, a sulfur atom, a sulfinyl (—SO—), and a sulfonyl (—$SO_2$—).

In the halogenated metal phthalocyanine pigment, the halogen atoms bonded to the benzene rings may be all identical or different. Different halogen atoms may be bonded to one benzene ring.

A halogenated metal phthalocyanine pigment including, among 8 to 16 halogen atoms per phthalocyanine molecule, 9 to 15 bromine atoms bonded to the benzene rings of a phthalocyanine molecule shows yellowish light green and therefore most suitably used for green pixel portions of a color filter. The halogenated metal phthalocyanine pigment is insoluble or hardly soluble in water and an organic solvent. Examples of the halogenated metal phthalocyanine pigment include both a halogenated metal phthalocyanine pigment that has not yet been subjected to a finishing treatment (referred to also as crude pigment) and a halogenated metal phthalocyanine pigment that has been subjected to the finishing treatment.

The halogenated metal phthalocyanine pigments belonging to Group 1 or 2 above can be represented by General Formula (PIG-1) below:

[Chem. 25]

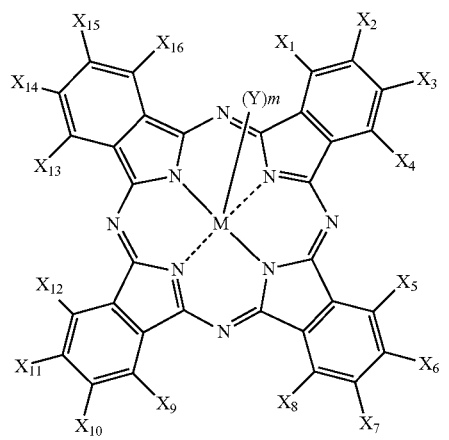

In General Formula (PIG-1), the halogenated metal phthalocyanine pigments belonging to Group 1 are as follows.

In General Formula (PIG-1), $X_1$ to $X_{16}$ represent a hydrogen atom, a chlorine atom, a bromine atom, or an iodine atom. The four X atoms bonded to one benzene ring may be identical or different. Among $X_1$ to $X_{16}$ bonded to the four benzene rings, 8 to 16 X's are chlorine atoms, bromine atoms, or iodine atoms. M represents a central metal. Among halogenated metal phthalocyanine pigments having the same Y, which is described below, and the same m, which is the number of Y's, a pigment in which, among 16 X's of $X_1$ to $X_{16}$, the total number of chlorine atoms, bromine atoms, and iodine atoms is less than 8 is blue. In a similar manner, among pigments in which, among 16 X's of $X_1$ to $X_{16}$, the total number of chlorine atoms, bromine atoms, and iodine atoms is 8 or more, the greater the total number of chlorine atoms, bromine atoms, and iodine atoms, the higher the degree of yellow. Y bonded to the central metal M is a monovalent atomic group selected from the group consisting of a halogen atom that is any one of fluorine, chlorine, bromine, and iodine; an oxygen atom; a hydroxy group; and a sulfonic group, and m represents the number of Y's bonded to the central metal N and is an integer of 0 to 2.

The value of m is determined on the basis of the valence of the central metal M. When the central metal N is trivalent as is the case for Al, Sc, Ga, Y, and In, m=1. In this case, one group selected from the group consisting of fluorine, chlorine, bromine, iodine, a hydroxy group, and a sulfonic group is bonded to the central metal. When the central metal M is tetravalent as is the case for Si, Ti, V, Ge, Zr, and Sn, m=2. In this case, one oxygen atom is bonded to the central metal, or two groups selected from the group consisting of fluorine, chlorine, bromine, iodine, a hydroxy group, and a sulfonic group are bonded to the central metal. When the central metal M is divalent as is the case for Mg, Fe, Co, Ni, Zn, Cu, Zr, Sn, and Pb, Y is absent.

In General Formula (PIG-1) shown above, the halogenated metal phthalocyanine pigments belonging to Group 2 are as follows.

In the General Formula (PIG-1), $X_1$ to $X_{16}$ are the same as defined above, the central metal M represents a trivalent metal selected from the group consisting of Al, Sc, Ga, Y, and In, and m represents 1. Y represents the following atomic group:

[Chem. 26]

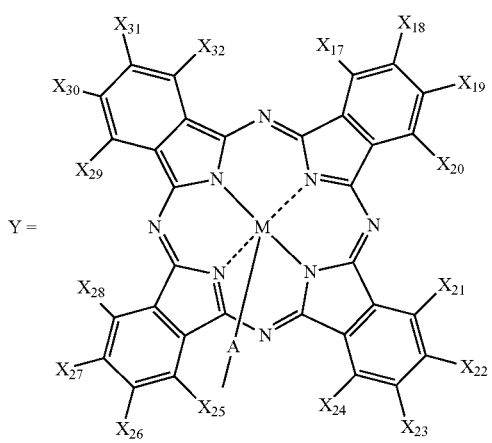

Y =

In the chemical structure of the atomic group Y, the central metal M is the same as defined above, and $X_{17}$ to $X_{32}$ are the same as the above-described definition of $X_1$ to $X_{16}$ in General Formula (PIG-1). A represents a divalent atomic group selected from the group consisting of an oxygen atom, a sulfur atom, a sulfinyl (—SO—), and a sulfonyl (—SO$_2$—). It is shown that M of General Formula (PIG-1) and M of the atomic group Y are bonded to each other via the divalent atomic group A.

In other words, the halogenated metal phthalocyanine pigments belonging to Group 2 are halogenated metal phthalocyanine dimers having a structural unit constituted by two halogenated metal phthalocyanine molecules that are bonded to each other via the divalent atomic group.

Specific examples of the halogenated metal phthalocyanine pigments represented by General Formula (PIG-1) include (1) to (4) described below.

(1) Halogenated metal phthalocyanine pigments, such as a halogenated copper phthalocyanine pigment, a halogenated tin phthalocyanine pigment, a halogenated nickel phtalocyanine pigment, and a halogenated zinc phtalocyanine pigment, including a divalent metal selected from the group consisting of Mg, Fe, Co, Ni, Zn, Cu, Zr, Sn, and Pb as a central metal, in which 8 to 16 halogen atoms are bonded to 4 benzene rings per phthalocyanine molecule. Among these pigments, in particular, a chlorinated and brominated zinc phtalocyanine pigment, that is, C. I. Pigment Green 58, is preferable.

(2) Halogenated metal phthalocyanine pigments, such as halogenated chloroaluminum phthalocyanine, including a trivalent metal selected from the group consisting of Al, Sc, Ga, Y, and In as a central metal, in which any one of a halogen atom, a hydroxy group, and a sulfonic group is bonded to the central metal and 8 to 16 halogen atoms are bonded to 4 benzene rings per phthalocyanine molecule.

(3) Halogenated metal phthalocyanine pigments, such as halogenated oxytitanium phthalocyanine and halogenated oxyvanadium phthalocyanine, including a tetravalent metal selected from the group consisting of Si, Ti, V, Ge, Zr, and Sn as a central metal, in which any one of one oxygen atom, two identical or different halogen atoms, two hydroxy groups, and two sulfonic groups is bonded to the central metal and 8 to 16 halogen atoms are bonded to 4 benzene rings per phthalocyanine molecule.

(4) Pigments constituted by halogenated metal phthalocyanine dimers, such as a halogenated μ-oxo-aluminium phthalocyanine dimer and a halogenated μ-thio-aluminium phthalocyanine dimer, which include a trivalent metal selected from the group consisting of Al, Sc, Ga, Y, and In as a central metal and which have a structural unit constituted by two halogenated metal phthalocyanine molecules in which 8 to 16 halogen atoms are bonded to 4 benzene rings per phthalocyanine molecule, the central metals of the structural unit being bonded to each other via a divalent atomic group selected from the group consisting of a oxygen atom, a sulfur atom, sulfinyl, and sulfonyl.

As a halogenated metal phthalocyanine pigment, specifically, one or more pigments selected from C. I. Pigment Green 7, 36, and 58 are preferably used and one or more pigments selected from Green 36 and 58 are more preferably used. As a phthalocyanine-based green dye, specifically, one or more dyes selected from C. I. Solvent Green 4, 5, 7, and 28 are preferably used. As a phthalocyanine-based blue dye, specifically, one or more dyes selected from C. I. Solvent Blue 4, 5, 25, 35, 36, 38, 58, 59, 67, and 70 are preferably used and one or more dyes selected from Blue 25, 38, 67, and 70 are more preferably used. As an azo-based yellow organic dye, specifically, one or more dyes selected from C. I. Solvent Yellow 2, 4, 14, 16, 18, 21, 56, 72, 124, 162, and 163 are preferably used and one or more dyes selected from Yellow 82 and 162 are more preferably used.

(R Pixel Portion)

The R pixel portion includes a diketopyrrolopyrrole-based red pigment, which preferably has an average primary particle size of 5 to 50 nm and more preferably has an average primary particle size of 10 to 30 nm as measured by small angle X-ray scattering. Specifically, as a diketopyrrolopyrrole pigment, one or more pigments selected from C. I. Pigment Red 254, 255, 264, and 272 and Orange 71 and 73 are preferable and one or more pigments selected from Red 254, 255, 264, and 272 are more preferable. In particular, C. I. Pigment Red 254 is preferable.

The R pixel portion preferably includes a pigment derivative as a dispersing aid. The R pixel portion preferably includes, as a pigment derivative, at least one pigment derivative selected from a quinacridone-based pigment derivative, a diketopyrrolopyrrole-based pigment derivative, an anthraquinone-based pigment derivative, and a thiazine-based pigment derivative. Examples of a derivative portion include a phthalimidemethyl group, a sulfonic group, an N-(dialkylamino)methyl group, and an N-(dialkylaminoalkyl)sulfonic acid amide group. These derivatives may be used in combination of two or more different types of derivatives.

The amount of pigment derivative used is preferably 4 parts or more and 17 parts or less and more preferably 6 parts or more and 13 parts or less relative to 100 parts of the diketopyrrolopyrrole-based red pigment.

(B Pixel Portion)

The B pixel portion preferably includes at least one pigment or dye selected from the group consisting of a ∈-type copper phthalocynian pigment, a triarylmethane pigment, and a cationic blue organic dye. The B pixel portion preferably include C. I. Solvent Blue 7 as a cationic blue organic dye. The ∈-type copper phthalocynian pigment is preferably C. I. Pigment Blue 15:6.

The triarylmethane pigment is preferably represented by General Formula (1) below:

[Chem. 27]

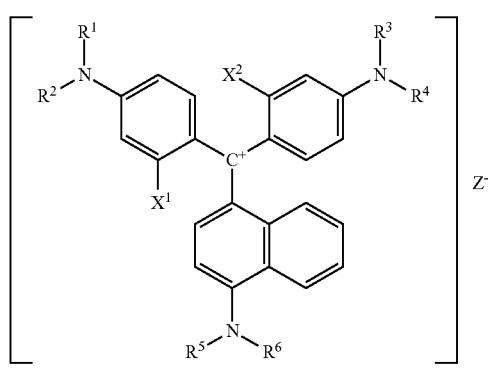

(in General Formula (1), $R^1$ to $R^6$ each independently represent a hydrogen atom, an unsubstituted or substituted alkyl group having a carbon number of 1 to 8, or an unsubstituted or substituted aryl group; when $R^1$ to $R^6$ represent an unsubstituted or substituted alkyl group, adjacent $R^1$ and $R^2$, adjacent $R^3$ and $R^4$, and adjacent $R^5$ and $R^6$ may be bonded to each other to form a ring structure; $X^1$ and $X^2$ each independently represent a hydrogen atom, a halogen atom, or an unsubstituted or substituted alkyl group having a carbon number of 1 to 8; $Z^-$ is at least one anion selected from a heteropolyoxometalate anion represented by $(P_2Mo_yW_{18-y}O_{62})^{6-}/6$ where y is an integer of 0, 1, 2, or 3, a heteropolyoxometalate anion represented by $(SiMoW_{11}O_{40})^{4-}/4$, and a lacunary Dawson-type phosphotungstic acid heteropolyoxometalate anion; and, when one molecule includes a plurality of structures represented by Formula (1), the structures may be identical or different)

In General Formula (1), $R^1$ to $R^6$ may be identical or different. Thus, —NRR (RR represents any one combination of $R^1R^2$, $R^3R^4$, and $R^5R^6$) group may be symmetrical or asymmetrical.

When adjacent R's (R represents any one of $R^1$ to $R^6$) are bonded to each other to form a ring, the ring may be cross-linked with a hetero atom. Specific examples of the ring include the following rings, which may be unsubstituted or substituted:

[Chem. 28]

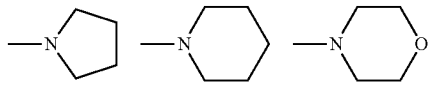

From the viewpoint of chemical stability, $R^1$ to $R^6$ are preferably each independently a hydrogen atom, an unsubstituted or substituted alkyl group, or an unsubstituted or substituted aryl group.

In particular, $R^1$ to $R^6$ are more preferably each independently a hydrogen atom; an alkyl group such as a methyl group, an ethyl group, a propyl group, an isopropyl group, a cyclopropyl group, a butyl group, an isobutyl group, a sec-butyl group, a tert-butyl group, a pentyl group, a cyclopentyl group, a hexyl group, a cyclohexyl group, a heptyl group, an octyl group, or a 2-ethylhexyl group; or an aryl group such as a phenyl group or a naphthyl group.

When $R^1$ to $R^6$ represent an alkyl group or an aryl group, the alkyl group or the aryl group may further include an optional substituent. Examples of the optional substituent that may be included in the alkyl group or the aryl group include the following [Substituent Group Y].

[Substituent Group Y]

Substituent group Y includes alkyl groups such as a methyl group, an ethyl group, a propyl group, an isopropyl group, a cyclopropyl group, a butyl group, an isobutyl group, a sec-butyl group, a tert-butyl group, a pentyl group, a cyclopentyl group, a hexyl group, a cyclohexyl group, a heptyl group, an octyl group, and a 2-ethylhexyl group; aryl groups such as a phenyl group and a naphthyl group; halogen atoms such as a fluorine atom and a chlorine atom; a cyano group; a hydroxy group; alkoxy groups having a carbon number of 1 to 8 such as a methoxy group, an ethoxy group, a propoxy group, and a butoxy group; unsubstituted or substituted amino groups such as an amino group, a diethylamino group, a dibutylamino group, and an acetylamino group; acyl groups such as an acetyl group and a benzoyl group; and acyloxy groups such as an acetyloxy group and a benzoyloxy group.

$R^1$ to $R^6$ are further preferably an unsubstituted or substituted alkyl group having a carbon number of 1 to 8, and more specific examples thereof include unsubstituted alkyl groups such as a methyl group, an ethyl group, a propyl group, an isopropyl group, a butyl group, an isobutyl group, a sec-butyl group, a pentyl group, a hexyl group, and a 2-ethylhexyl group; alkoxyalkyl groups such as a 2-methoxyethyl group and a 2-ethoxyethyl group; acyloxy groups such as a 2-acetyloxyethyl group; cyanoalkyl groups such as a 2-cyanoethyl group; fluoroalkyl groups such as a 2,2,2-trifluoroethyl group and a 4,4,4-trifluorobutyl group.

When $X^1$ and $X^2$ are any one of the above-described alkyl groups, $X^1$ and $X^2$ may further include an optional substituent. Examples of the optional substituent include halogen atoms such as a fluorine atom, a chlorine atom, a bromine atom, and an iodine atom; and alkoxy groups such as a methoxy group, an ethoxy group, and a propoxy group. Specific examples of $X^1$ and $X^2$ include haloalkyl groups such as a fluoromethyl group, a trifluoromethyl group, a trichloromethyl group, and a 2,2,2-trifluoroethyl group; and alkoxyalkyl groups such as a methoxymethyl group.

$X^1$ and $X^2$ are preferably a substituent such as a hydrogen atom, a methyl group, a chlorine atom, or a trifluoromethyl group, which has an appropriate degree of steric hindrance that does not affect torsion. $X^1$ and $X^2$ are most preferably a hydrogen atom, a methyl group, or a chlorine atom from the viewpoints of color tone and heat resistance.

$Z^-$ is at least one anionic triarylmethane compound selected from a heteropolyoxometalate anion represented by $(P_2Mo_yW_{18-y}O_{62})^{6-}/6$, where y is an integer of 0, 1, 2, or 3; a heteropolyoxometalate anion represented by $(SiMoW_{11}O_{40})^{4-}/4$; and a lacunary Dawson-type phosphotungstic acid heteropolyoxometalate anion. Specifically, the lacunary Dawson-type phosphotungstic acid is preferably a 1-lacunary Dawson-type phosphotungstic acid heteropolyoxometalate anion $(P_2W_{17}O_{61})^{10-}/10$ from the viewpoint of durability.

Specific examples of the triarylmethane pigment represented by General Formula (1) include the compounds shown in Tables 1 to 7 below. However, the present invention is not limited to these compounds as long as the idea of the present invention is not impaired.

TABLE 1

| No | R1 | R2 | R3 | R4 | R5 | R6 | X1 | X2 | Z— |
|---|---|---|---|---|---|---|---|---|---|
| 1 | C2H5— | C2H5— | C2H5— | C2H5— | C2H5— | H | H | H | (P2W18O62)6— |
| 2 | C2H5— | C2H5— | C2H5— | C2H5— | C2H5— | H | H | H | (P2MoW17O62)6— |
| 3 | C2H5— | C2H5— | C2H5— | C2H5— | C2H5— | H | H | H | (P2Mo2W16O62)6— |
| 4 | C2H5— | C2H5— | C2H5— | C2H5— | C2H5— | H | H | H | (P2Mo3W15O62)6— |
| 5 | C2H5— | C2H5— | C2H5— | C2H5— | C2H5— | H | H | H | (SiMoW11O40)4— |
| 6 | C2H5— | C2H5— | C2H5— | C2H5— | C2H5— | H | H | H | (P2W17O61)10— |
| 7 | CH3— | CH3— | CH3— | CH3— | C2H5— | H | H | H | (P2W18O62)6 |
| 8 | CH3— | CH3— | CH3— | CH3— | C2H5— | H | H | H | (P2MoW17O62)6— |
| 9 | CH3— | CH3— | CH3— | CH3— | C2H5— | H | H | H | (P2Mo3W15O62)6— |

TABLE 2

| No | R1 | R2 | R3 | R4 | R5 | R6 | X1 | X2 | Z— |
|---|---|---|---|---|---|---|---|---|---|
| 10 | CH3— | CH3— | CH3— | CH3— | C2H5— | H | H | H | (P2Mo3W15O62)6 |
| 11 | CH3— | CH3— | CH3— | CH3— | C2H5— | H | H | H | (SiMoW11O40)4— |
| 12 | CH3— | CH3— | CH3— | CH3— | C2H5— | H | H | H | (P2W17O61)10— |
| 13 | CH3— | CH3— | CH3— | CH3— | Ph— | H | H | H | (P2W18O62)6— |
| 14 | CH3— | CH3— | CH3— | CH3— | Ph— | H | H | H | (P2MoW17O62)6— |
| 15 | CH3— | CH3— | CH3— | CH3— | Ph— | H | H | H | (P2Mo2W16O62)6— |
| 16 | CH3— | CH3— | CH3— | CH3— | Ph— | H | H | H | (P2Mo3W15O62)6— |
| 17 | CH3— | CH3— | CH3— | CH3— | Ph— | H | H | H | (SiMoW11O40)4— |
| 18 | CH3— | CH3— | CH3— | CH3— | Ph— | H | H | H | (P2W17O61)10— |

TABLE 3

| No | R1 | R2 | R3 | R4 | R5 | R6 | X1 | X2 | Z— |
|---|---|---|---|---|---|---|---|---|---|
| 19 | CH3— | CH3— | CH3— | CH3— | Ph— | Me | H | H | (P2W18O62)6— |
| 20 | CH3— | CH3— | CH3— | CH3— | Ph— | Me | H | H | (P2MoW17O62)6— |
| 21 | CH3— | CH3— | CH3— | CH3— | Ph— | Me | H | H | (P2Mo2W16O62)6— |
| 22 | CH3— | CH3— | CH3— | CH3— | Ph— | Me | H | H | (P2Mo3W15O62)6— |
| 23 | CH3— | CH3— | CH3— | CH3— | Ph— | Me | H | H | (SiMoW11O40)4— |
| 24 | CH3— | CH3— | CH3— | CH3— | Ph— | Me | H | H | (P2W17O61)10— |
| 25 | n-C3H7— | n-C3H7— | n-C3H7— | n-C3H7— | C2H5— | H | H | H | (P2W18O62)6— |
| 26 | n-C3H7— | n-C3H7— | n-C3H7— | n-C3H7— | C2H5— | H | H | H | (P2MoW17O62)6— |
| 27 | n-C3H7— | n-C3H7— | n-C3H7— | n-C3H7— | C2H5— | H | H | H | (P2Mo2W16O62)6— |

TABLE 4

| No | R1 | R2 | R3 | R4 | R5 | R6 | X1 | X2 | Z— |
|---|---|---|---|---|---|---|---|---|---|
| 28 | C2H5— | C2H5— | C2H5— | C2H5— | C2H5— | H | CH3— | H | (P2W18O62)6— |
| 29 | C2H5— | C2H5— | C2H5— | C2H5— | C2H5— | H | CH3— | H | (P2MoW17O62)6— |
| 30 | C2H5— | C2H5— | C2H5— | C2H5— | C2H5— | H | CH3— | H | (P2Mo2W16O62)6— |
| 31 | C2H5— | C2H5— | C2H5— | C2H5— | C2H5— | H | CH3— | H | (P2Mo3W15O62)6— |
| 32 | C2H5— | C2H5— | C2H5— | C2H5— | C2H5— | H | CH3— | H | (SiMoW11O40)4— |
| 33 | C2H5— | C2H5— | C2H5— | C2H5— | C2H5— | H | CH3— | H | (P2W17O61)10— |
| 34 | C2H5— | C2H5— | C2H5— | C2H5— | C2H5— | H | CH3— | CH3— | (P2W18O62)6 |
| 35 | C2H5— | C2H5— | C2H5— | C2H5— | C2H5— | H | CH3— | CH3— | (P2MoW17O62)6— |
| 36 | C2H5— | C2H5— | C2H5— | C2H5— | C2H5— | H | CH3— | CH3— | (P2Mo3W15O62)6— |

TABLE 5

| No | R1 | R2 | R3 | R4 | R5 | R6 | X1 | X2 | Z— |
|---|---|---|---|---|---|---|---|---|---|
| 37 | C2H5— | C2H5— | C2H5— | C2H5— | C2H5— | H | CH3— | CH3— | (P2Mo3W15O62)6— |
| 38 | C2H5— | C2H5— | C2H5— | C2H5— | C2H5— | H | CH3— | CH3— | (SiMoW11O40)4— |
| 39 | C2H5— | C2H5— | C2H5— | C2H5— | C2H5— | H | CH3— | CH3— | (P2W17O61)10— |
| 40 | C2H5— | C2H5— | C2H5— | C2H5— | C2H5— | H | Cl | H | (P2W18O62)6— |
| 41 | C2H5— | C2H5— | C2H5— | C2H5— | C2H5— | H | Cl | H | (P2MoW17O62)6— |
| 42 | C2H5— | C2H5— | C2H5— | C2H5— | C2H5— | H | Cl | H | (P2Mo2W16O62)6— |
| 43 | C2H5— | C2H5— | C2H5— | C2H5— | C2H5— | H | Cl | H | (P2Mo3W15O62)6— |
| 44 | C2H5— | C2H5— | C2H5— | C2H5— | C2H5— | H | Cl | H | (SiMoW11O40)4— |
| 45 | C2H5— | C2H5— | C2H5— | C2H5— | C2H5— | H | Cl | H | (P2W17O61)10— |

TABLE 6

| No | R1 | R2 | R3 | R4 | R5 | R6 | X1 | X2 | Z— |
|---|---|---|---|---|---|---|---|---|---|
| 46 | C2H5— | C2H5— | C2H5— | C2H5— | C2H5— | C2H5— | H | H | (P2W18O62)6— |
| 47 | C2H5— | C2H5— | C2H5— | C2H5— | C2H5— | C2H5— | H | H | (P2MoW17O62)6— |
| 48 | C2H5— | C2H5— | C2H5— | C2H5— | C2H5— | C2H5— | H | H | (P2Mo2W16O62)6— |
| 49 | C2H5— | C2H5— | C2H5— | C2H5— | C2H5— | C2H5— | H | H | (P2Mo3W15O62)6— |
| 50 | C2H5— | C2H5— | C2H5— | C2H5— | C2H5— | C2H5— | H | H | (SiMoW11O40)4— |
| 51 | C2H5— | C2H5— | C2H5— | C2H5— | C2H5— | C2H5— | H | H | (P2W17O61)10— |
| 52 |  | |  | | C2H5— | H | H | H | (P2W18O62)6— |
| 53 |  | |  | | C2H5— | H | H | H | (P2MoW17O62)6— |
| 54 |  | |  | | C2H5— | H | H | H | (P2Mo2W16O62)6— |

TABLE 7

| No. | R1 | R2 | R3 | R4 | R5 | R6 | X1 | X2 | Z— |
|---|---|---|---|---|---|---|---|---|---|
| 55 |  | |  | | C2H5— | H | H | H | (P2Mo3W15O62)6— |
| 56 |  | |  | | C2H5— | H | H | H | (SiMoW11O40)4— |
| 57 |  | |  | | C2H5— | H | H | H | (P2W17O61)10— |
| 58 | 4,4,4-trifluorobutyl | 4,4,4-trifluorobutyl | C2H5— | C2H5— | C2H5— | H | H | H | (P2W18O62)6— |
| 59 | 4,4,4-trifluorobutyl | 4,4,4-trifluorobutyl | C2H5— | C2H5— | C2H5— | H | H | H | (P2MoW17O62)6— |
| 60 | 4,4,4-trifluorobutyl | 4,4,4-trifluorobutyl | C2H5— | C2H5— | C2H5— | H | H | H | (SiMoW11O40)4— |
| 61 | 4,4,4-trifluorobutyl | 4,4,4-trifluorobutyl | C2H5— | C2H5— | C2H5— | H | CH3— | H | (P2W18O62)6— |
| 62 | 4,4,4-trifluorobutyl | 4,4,4-trifluorobutyl | C2H5— | C2H5— | C2H5— | H | CH3 | H | (P2MoW17O62)6— |
| 63 | 4,4,4-trifluorobutyl | 4,4,4-trifluorobutyl | C2H5— | C2H5— | C2H5— | H | CH3 | H | ((SiMoW11O40)4— |

It is preferable that, in the above-described RGB three-color pixel portion, the R pixel portion includes, as a coloring material, C. I. Pigment Red 254 having an average primary particle size of 5 to 50 nm as measured by small angle X-ray scattering, that the G pixel portion includes, as a coloring material, a mixture of C. I. Solvent Blue 67 and C. I. Solvent Yellow 82 and/or C. I. Solvent Yellow 162, and that the B pixel portion includes, as a coloring material, a triarylmethane pigment represented by General Formula (1).

It is also preferable that, in the RGB three-color pixel portion, the R pixel portion includes, as a coloring material, C. I. Pigment Red 254 having an average primary particle size of 5 to 50 nm as measured by small angle X-ray scattering, that the G pixel portion includes, as a coloring material, one or more pigments selected from C. I. Pigment Green 7, 36, and 58, and that the B pixel portion includes, as a coloring material, a triarylmethane pigment represented by General Formula (1).

In the RGB three-color pixel portion, the R pixel portion preferably further includes, as a coloring material, at least one organic dye or organic pigment selected from the group consisting of C. I. Pigment Red 177, 242, 166, 167, and 179; C. I. Pigment Orange 38 and 71; C. I. Pigment Yellow 150, 215, 185, 138, and 139; C. I. Solvent Red 89; C. I. Solvent Orange 56; and C. I. Solvent Yellow 21, 82, 83:1, 33, and 162.

In the RGB three-color pixel portion, the G pixel portion preferably further includes, as a coloring material, at least one organic dye or organic pigment selected from the group consisting of C. I. Pigment Yellow 150, 215, 185, and 138; and C. I. Solvent Yellow 21, 82, 83:1, and 33.

In the RGB three-color pixel portion, the B pixel portion preferably further includes, as a coloring material, at least one organic dye or organic pigment selected from the group consisting of C. I. Pigment Blue 1; C. I. Pigment Violet 23; C. I. Basic Blue 7; C. I. Basic Violet 10; C. I. Acid Blue 1, 90, and 83; C. I. Direct Blue 86; and C. Pigment Blue 15, 15:1, 15:2, 15:3, 15:4, and 15:6.

It is also preferable that the color filter includes a black matrix, an RGB three-color pixel portion, and a Y pixel portion and that the Y pixel portion includes, as a coloring material, at least one organic dye or organic pigment selected from the group consisting of C. I. Pigment low 150, 215, 185, 138, and 139; and C. I. Solvent Yellow 21, 82, 83:1, 33, and 162.

As for the color filter, color filter pixel portions may be formed by a publicly known method. A typical method for forming pixel portions is photolithography. In photolithography, the photo-curable composition described below is applied to a surface of a transparent substrate for a color filter on which a black matrix is disposed and then dried by being heated (pre-baked). Subsequently, the surface of the transparent substrate for a color filter is irradiated with ultraviolet rays via a photo mask to perform pattern exposure, and thereby portions of the photo-curable compound deposited at positions corresponding to pixel portions are caused to be cured. Unexposed portions are developed with a developing solution, and thereby non-pixel portions are removed and pixel portions are fixed on the transparent substrate. In this method, pixel portions constituted by a cured, colored coating film composed of a photo-curable composition are formed on the transparent substrate.

For each colored pixels of R pixels, G pixels, B pixels, and, as needed, other color pixels such as Y pixels, the photo-curable compositions described below are prepared and the above-described operations are repeated. Thus, a color filter including colored pixel portions of R pixels, G pixels, B pixels, and Y pixels formed at the respective predetermined positions can be produced.

Examples of a method for applying the photo-curable composition described below onto a transparent substrate composed of glass or the like include spin coating, slit coating, roll coating, and an ink-jet method.

The conditions for drying a coating film composed of a photo-curable composition applied onto a transparent substrate are generally at 50° C. to 150° C. for about 1 to about 15 minutes, which vary depending on, for example, the types of and proportions of constituents. Light used for photo-curing of a photo-curable composition is preferably ultraviolet rays in the wavelength range of 200 to 500 nm or visible light. Various light sources that emit light in this wavelength range may be used.

Examples of a developing method include a liquid application method, a dipping method, and a spraying method. After the exposure and the development of the photo-curable composition, the transparent substrate on which the pixel portions of the necessary colors are formed is washed with water and then dried. The resulting color filter is subjected to a heat treatment (post-baking) at 90° C. to 280° C. for a predetermined time using a heating device such as a hot plate or an oven. This removes volatile constituents contained in the colored coating film and causes an unreacted portion of the photo-curable compound remaining in the cured, colored coating film composed of the photo-curable composition to be heat-cured. Thus, a color filter is completed.

By using the coloring material for a color filter according to the present invention in combination with the liquid crystal composition according to the present invention, a liquid crystal display device that allows a reduction in the voltage holding ratio (VHR) of a liquid crystal layer and an increase in the ion density (ID) of the liquid crystal layer to be suppressed and addresses faulty display issues such as white missing pixels, alignment inconsistencies, and burn-in can be provided.

A general method for producing the photo-curable composition is as follows. A dye and/or pigment composition for a color filter according to the present invention, an organic solvent, and a dispersing agent are used as essential components. These components are mixed, and the resulting mixture is stirred so as to form a homogeneous dispersion. Thus, a pigment dispersion for forming pixel portion of a color filter is prepared. Then, a photo-curable compound and, as needed, a thermoplastic resin, a photopolymerization initiator, and the like are added to the pigment dispersion. Thus, the photo-curable composition is prepared.

Examples of the organic solvent used above include aromatic compound solvent such as toluene, xylene, and methoxybenzene; acetic acid ester solvents such as ethyl acetate, propyl acetate, butyl acetate, propylene glycol monomethyl ether acetate, propylene glycol monoethyl ether acetate, diethylene glycol methyl ether acetate, diethylene glycol ethyl ether acetate, diethylene glycol propyl ether acetate, and diethylene glycol butyl ether acetate; propionate solvents such as ethoxyethyl propionate; alcohol solvents such as methanol and ethanol; ether solvents such as butyl cellosolve, propylene glycol monomethyl ether, diethylene glycol ethyl ether, and diethylene glycol dimethyl ether; ketone solvents such as methyl ethyl ketone, methyl isobutyl ketone, and cyclohexanone; aliphatic hydrocarbon solvents such as hexane; nitrogen compound solvents such as N,N-dimethylformamide, γ-butyrolactam, N-methyl-2-pyrrolidone, aniline, and pyridine; lactone solvents such as γ-butyrolactone; and carbamic acid ester solvents such as a 48:52 mixture of methyl carbamate and ethyl carbamate.

Examples of the dispersing agent used above include DISPERBYK 130, DISPERBYK 161, DISPERBYK 162, DISPERBYK 163, DISPERBYK 170, DISPERBYK 171, DISPERBYK 174, DISPERBYK 180, DISPERBYK 182, DISPERBYK 183, DISPERBYK 184, DISPERBYK 185, DISPERBYK 2000, DISPERBYK 2001, DISPERBYK 2020, DISPERBYK 2050, DISPERBYK 2070, DISPERBYK 2096, DISPERBYK 2150, DISPERBYK 2164, DISPERBYK LPN21116, and DISPERBYK LPN6919 produced by BYK-Chemie; EFKA 46, EFKA 47, EFKA 452, EFKA LP4008, EFKA 4009, EFKA LP4010, EFKA LP4050, LP4055, EFKA 400, EFKA 401, EFKA 402, EFKA 403, EFKA 450, EFKA 451, EFKA 453, EFKA 4540, EFKA 4550, EFKA LP4560, EFKA 120, EFKA 150, EFKA 1501, EFKA 1502, and EFKA 1503 produced by EFKA; Solsperse 3000, Solsperse 9000, Solsperse 13240, Solsperse 13650, Solsperse 13940, Solsperse 17000, 18000, Solsperse 20000, Solsperse 21000, Solsperse 20000, Solsperse 24000, Solsperse 26000, Solsperse 27000, Solsperse 28000, Solsperse 32000, Solsperse 36000, Solsperse 37000, Solsperse 38000, Solsperse 41000, Solsperse 42000, Solsperse 43000, Solsperse 46000, Solsperse 54000, and Solsperse 71000 produced by Lubrizol Corporation; and AJISPER PB711, AJISPER PB821, AJISPER PB822, AJISPER PB814, AJISPER PN411, and AJISPER PA111 produced by Ajinomoto Co., Inc. In addition, synthetic resins that are insoluble in water and liquid at room temperature may also be used, and examples thereof include an acrylic resin; a urethane resin; an alkyd resin; natural rosins such as a wood rosin, a gum rosin, and a tall rosin; modified rosins such as a polymerized rosin, a disproportionated rosin, a hydrogenated rosin, an oxidized rosin, and a maleated rosin; and rosin derivatives such as a rosin amine, a lime rosin, alkylene oxide adducts of a rosin, alkyd adducts of a rosin, and a rosin-modified phenol. Addition of these dispersing agents and these resins contributes to reduction in flocculation, improvement of the dispersion stability of the pigments, and improvement of the viscometric property of the dispersion solutions.

An organic pigment derivative may also be added as a dispersing aid, and examples thereof include a phthalimidemethyl derivative, a sulfonic acid derivative, a N-(dialkylamino)methyl derivative, and a N-(dialkylaminoalkyl)sulfonic acid amide derivative. Needless to say, these derivatives may be used in combination of two or more different types of derivatives.

Examples of the thermoplastic resin used for preparing the photo-curable composition include a urethane resin, an acrylic resin, a polyamide resin, a polyimide resin, a styrene-maleic acid-based resin, and a styrene-maleic anhydride-based resin.

Examples of the photo-curable compound include difunctional monomers such as 1,6-hexanediol diacrylate, ethylene glycol diacrylate, neopentyl glycol diacrylate, triethylene glycol diacrylate, bis(acryloxyethoxy)bisphenol A, and 3-methylpentanediol diacrylate; multifunctional monomers having a relatively low molecular weight, such as trimethylolpropane triacrylate, pentaerythritol triacrylate, tris[2-(meth)acryloyloxyethyl]isocyanurate, dipentaerythritol hexaacrylate, and dipentaerythritol pentaacrylate; and multifunctional monomers having a relatively high molecular weight, such as polyester acrylate, polyurethane acrylate, and polyether acrylate.

Examples of the photopolymerization initiator include acetophenone, benzophenone, benzildimethylketal, benzoyl peroxide, 2-chlorothioxanthone, 1,3-bis(4'-azidobenzal)-2-propane, 1,3-bis(4'-azidobenzal)-2-propane-2'-sulfonic acid, and 4,4'-diazidostilbene-2,2'-disulfonic acid. Examples of commercially available photopolymerization initiators include "Irgacure (trade name)-184", "Irgacure (trade name)-369", "Darocur (trade name)-1173", and "Lucirin-TPO" produced by BASF,"KAYACURE (trade name) DETX" and "KAYACURE (trade name) OA" produced by Nippon Kayaku Co., Ltd., "Vicure 10" and "Vicure 55" produced by Stauffer Chemical Co., "Trigonal PI" produced by Akzo Nobel N.V., "Sandrey 1000" produced by Sand, "Deep" produced by Upjohn Company, and "Biimidazole" produced by KUROGANE KASEI Co., Ltd.

Publicly known, commonly used photosensitizers may be used in combination with the above-described photopolymerization initiators. Examples of the photosensitizers include amines, ureas, compounds containing a sulfur atom, compounds containing a phosphorus atom, compounds containing a chlorine atom, and compounds containing a nitrogen atom, such as nitriles. These compounds may be used alone or in combination of two or more.

Although not particularly limited, the mixing ratio of the photopolymerization initiator is preferably 0.1% to 30% by mass relative to the amount of compound including a photopolymerizable or photo-curable functional group. If the mixing ratio is less than 0.1%, the photographic sensitivity during photo-curing tends to decrease. If the mixing ratio exceeds 30%, the crystal of the photopolymerization initiator precipitates when a pigment-dispersed resist coating film is dried, which may cause degradation of the physical properties of the coating film.

Using the above-described materials, by mass, 300 to 1000 parts of an organic solvent and 1 to 100 parts of a dispersing agent per 100 parts of the dye and/or pigment composition for a color filter according to the present invention are mixed, and the resulting mixture was stirred so as to form a homogeneous dispersion. Thus, the above-described dye and pigment liquid is prepared. Subsequently, 3 to 20 parts of the total mass of a thermoplastic resin and a photo-curable compound per part of the pigment composition for a color filter according to the present invention, 0.05 to 3 parts of a photopolymerization initiator per part of the photo-curable compound, and, as needed, an organic solvent are added in the pigment dispersion. The resulting mixture is stirred so as to form a homogeneous dispersion. Thus, a photo-curable composition for forming color filter pixel portions is prepared.

Publicly known and commonly used organic solvents and aqueous alkaline solutions may be used as a developing solution. In particular, when the photo-curable composition includes a thermoplastic resin or a photo-curable compound and at least one of them has an acid value and alkali-solubility, washing with an aqueous alialine solution may be effective in forming color filter pixel portions.

A method for producing color filter pixel portions by photolithography is described in detail. However, in order to produce the color filter pixel portions using pigment compositions for a color filter according to the present invention, other methods such as an electrodeposition method, a transfer method, a micelle electrolysis method, a PVED (photovoltaicelectrodeposition) method, an ink-jet method, a reverse printing method, and a thermosetting method may be employed to form pixel portions for each color.

(Alignment Film)

In the liquid crystal display device according to the present invention, when an alignment film is needed in order to align a liquid crystal composition, an alignment film is disposed between the color filter and the liquid crystal layer on surfaces of the first substrate and the second substrate which are brought into contact with the liquid crystal composition. The thickness of the alignment film is small, that is, 100 nm or less even in the case the alignment film has a large thickness. Thus, the alignment film does not completely block the interaction between coloring agents such as pigments constituting a color filter and a liquid crystal compound constituting the liquid crystal layer.

In a liquid crystal display device that does not include an alignment film, the interaction between coloring agents, such as pigments, constituting a color filter and a liquid crystal compound constituting the liquid crystal layer becomes stronger.

Examples of the material of the alignment film include transparent organic materials such as polyimide, polyamide, BCB (benzocyclobutene polymer), and polyvinyl alcohol. In particular, a polyimide alignment film formed by imidization of a polyamic acid synthesized from a diamine, such as aliphatic or alicyclic diamines including p-phenylenediamine and 4,4'-diaminodiphenylmethane, and an aromatic tetracarboxylic acid anhydride, such as aliphatic or alicyclic tetracarboxylic acid anhydrides including butanetetracarboxylic acid anhydride and 2,3,5-tricarboxycyclopentyl acetic acid anhydride or pyromellitic dianhydride, is preferable. In this case, an alignment is formed generally by rubbing. When the material is used for forming a vertical alignment film or the like, the material may be used without forming an alignment.

The material of the alignment film may be a material including chalcone, cinnamate, cinnamoyl, or an azo group in its compound. This material may be used in combination with a material such as polyimide or polyamide and, in this case, an alignment film may be formed by rubbing or by a photo-alignment technology.

In order to form an alignment film, generally, an alignment film material is applied onto a substrate by spin coating to form a resin film. Alternatively, a uniaxial stretching method, the Langmuir-Blodgett method, and the like may be employed.

(Transparent Electrode)

In the liquid crystal display device according to the present invention, the material of the transparent electrode may be a conductive metal oxide. Examples of the metal oxide include indium oxide ($In_2O_3$), tin oxide ($SnO_2$), zinc oxide (ZnO), indium tin oxide ($In_2O_3$—$SnO_2$), indium zinc oxide ($In_2O$—ZnO), niobium-doped titanium dioxide ($Ti_{1-x}Nb_xO_2$), fluorine-doped tin oxide, graphene nanoribbon, and metal nanowire. Zinc oxide (ZnO), indium tin oxide ($In_2O_3$—$SnO_2$), and indium zinc oxide ($In_2O_3$—ZnO) are preferable. Patterning of these transparent conductive films may be performed by, for example, photo-etching or a method using a mask.

EXAMPLES

A part of the preferred embodiment of the present invention is described in detail with reference to Examples below, which do not limit the present invention. In the compositions described in Examples and Comparative Examples below, "%" means "% by mass".

The physical properties of a liquid crystal composition are represented as follows.

$T_{N-I}$: nematic phase-isotropic liquid phase transition temperature (° C.) as an upper limit temperature of liquid crystal phase Δ∈: dielectric constant anisotropy Δn: refractive index anisotropy η: viscosity (mPa·s) at 20° C.

$d_{gap}$: gap (μm) between a first substrate and a second substrate of a cell

VHR: voltage holding ratio (%) at 70° C.

(the ratio (%) of a voltage measured under the conditions of an applied voltage of 5 V, a frame time of 200 ms, and a pulse width of 64 μs when the liquid crystal composition is injected into a cell having a thickness of 3.5 μm to an initially applied voltage)

ID: ion density (pC/cm²) at 70° C. (an ion density measured with MTR-1 (produced by TOYO Corporation) under the conditions of applied voltage of 20 V and a frequency of 0.05 Hz when the liquid crystal composition is injected into a cell having a thickness of 3.5 μm)

The following abbreviations are used to describe compounds.

n (numeral) at the end $C_nH_{2n+1}$—
-2- —$CH_2CH_2$—
-1O— —$CH_2O$—
—O1- —$OCH_2$—
—$O_n$— —$OC_nH_{2n+1}$
-1=1- —HC=CH—
—VO— —COO—
ndm- $C_nH_{2n+1}$—HC=CH—$(CH_2)_{m-1}$—

[Chem. 29]

Cy

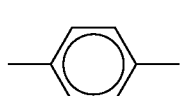
Ph

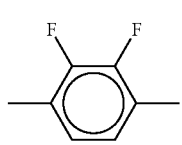
Ph5

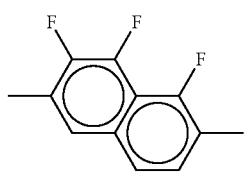
Nd4

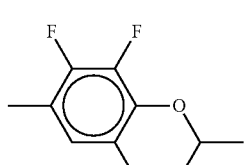
Ch3

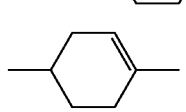
Cb

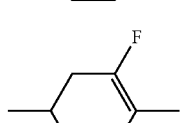
Cb1

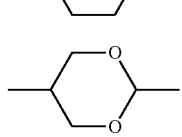
Oc

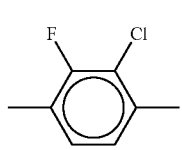
Ph15

The liquid crystal display device was evaluated in terms of burn-in as follows. A predetermined fixed pattern was displayed in a displaying area for 1000 hours. Subsequently, uniform display over the entire screen was performed and the level of a residual image of the fixed pattern was visually inspected and rated on the following four scales.

Excellent: A residual image was absent.

Good: A slight residual image was present but at an acceptable level.

Poor: A residual image was present and at an unacceptable level.

Failure: A residual image was present and at a severe level.

[Preparation of Color Filter]

[Preparation of Colored Composition]

[Red Pigment Colored Composition 1]

Into a plastic bottle, 10 parts of a red pigment 1 (C. I. Pigment Red 254) having an average primary particle size of 25 nm and a normalized dispersion of 40% as measured by small angle X-ray scattering was charged. Into the plastic bottle, 55 parts of propylene glycol monomethyl ether acetate, 7.0 parts of DISPERBYK LPN21116 (produced by BYK-Chemie), and 0.3-to-0.4-mmϕzirconia beads "ER-120S" produced by Saint-Gobain were added. The resulting mixture was dispersed for 4 hours using Paint Conditioner (produced by Toyo Seiki Kogyo Co., Ltd.) and then filtered through a 1-μm filter. Thus, a pigment dispersion was prepared. Then, 75.00 parts of the pigment dispersion, 5.50 parts of polyester acrylate resin (ARONIX (trade name) M7100, produced by TOAGOSEI CO., LTD.), 5.00 parts of dipentaerythritol hexaacrylate (KAYARAD (trade name) DPHA, produced by Nippon Kayaku Co., Ltd.), 1.00 parts of benzophenone (KAYACURE (trade name) BP-100, produced by Nippon Kayaku Co., Ltd.), and 13.5 parts of UCAR ester EEP were mixed and stirred with a dispersion stirrer, and the resulting mixture was filtered through a filter having a pore size of 1.0 μm. Thus, a red pigment colored composition 1 was prepared.

Note that the average primary particle size and the particle-size distribution of an organic pigment were determined from small angle X-ray scattering profiles (measured scattering profiles) of the organic pigment dispersion based on small angle X-ray scattering described in Japanese Unexamined Patent Application Publication No. 2006-113042.

[Red Pigment Colored Composition 2]

A red pigment colored composition 2 was prepared as described above except that 9.95 parts of a red pigment 2 (C. I. Pigment Red 254) having an average primary particle size of 15 nm and a normalized dispersion of 55% as measured by small angle X-ray scattering and 0.05 parts of the sulfonic acid derivative of diketopyrrolopyrrole were used instead of 10 parts of the red pigment 1 used for preparing the red pigment colored composition 1.

[Red Pigment Colored Composition 3]

A red pigment colored composition 3 was prepared as described above except that 9.95 parts of a red pigment 3 (C. I. Pigment Red 255) having an average primary particle size of 20 nm and a normalized dispersion of 48% as measured by small angle X-ray scattering and 0.04 parts of the phthalimidomethyl derivative of dichloroquinacridone were used instead of 10 parts of the red pigment 1 used for preparing the red pigment colored composition 1.

[Red Pigment Colored Composition 4]

A red pigment colored composition 4 was prepared as described above except that 7.36 parts of the red pigment 3 having an average primary particle size of 10 nm and a normalized dispersion of 60% as measured by small angle X-ray scattering, 0.64 parts of the sulfonic acid derivative of diaminoanthraquinonyl, and 2 parts of a yellow pigment 2 (C. I. Pigment Yellow 139) were used instead of 10 parts of the red pigment 1 used for preparing the red pigment colored composition 1.

[Green Pigment Colored Composition 1]

A green pigment colored composition 1 was prepared as described above except that 6 parts of a green pigment 1 (C. I. Pigment Green 36, "FASTOGEN GREEN 2YK-CF" produced by DIC Corporation) and 4 parts of a yellow pigment 1 (C. I. Pigment Yellow 150, FANCHON FAST YELLOW E4GN produced by LANXESS) were used instead of 10 parts of the red pigment 1 used for preparing the red pigment colored composition 1.

[Green Pigment Colored Composition 2]

A green pigment colored composition 2 was prepared as described above except that 4 parts of green pigment 2 (C. I. Pigment Green 58, FASTOGEN GREEN A110 produced by DIC Corporation) and 6 parts of the yellow pigment 3 (C. I. Pigment YELLOW 138) were used instead of 6 parts of the green pigment 1 and 4 parts of the yellow pigment 1 used for preparing the green pigment colored composition 1.

A blue pigment colored composition 1 was prepared as described above except that 9 parts of a blue pigment 1 (C. I. Pigment Blue 15:6, "FASTOGEN BLUE EP-210" produced by DIC Corporation) and 1 part of a violet pigment 1 (C. I. Pigment VIOLET 23) were used instead of 10 parts of the red pigment 1 used for preparing the red pigment colored composition 1.

[Blue Pigment Colored Composition 2]

Into a plastic bottle, 1.80 parts of a triarylmethane pigment (compound No. 2 in Table 1) represented by General Formula (1) shown above, 2.10 parts of BYK-2164 (produced by BYK-Chemie), 11.10 parts of propylene glycol monomethyl ether acetate, and 0.3-to-0.4-mmϕseppel beads were charged. Dispersion was conducted for 4 hours using Paint Conditioner (produced by Toyo Seiki Kogyo Co., Ltd.). Thus, a pigment dispersion was prepared. A mixture of 75.00 parts of the pigment dispersion, 5.50 parts of a polyester acrylate resin (ARONIX (trade name) M7100, produced by TOAGOSEI CO., LTD.), 5.00 parts of dipentaerythritol hexaacrylate (KAYARAD (trade name) DPHA, produced by Nippon Kayaku Co., Ltd.), 1.00 parts of benzophenone (KAYACURE (trade name) BP-100, produced by Nippon Kayaku Co., Ltd.), and 13.5 parts of UCAR ester EEP (produced by Union Carbide Corporation) was stirred with a dispersion stirrer and filtered through a filter having a pore size of 1.0 μm. Thus, a blue pigment colored composition 2 was prepared.

[Blue Pigment Colored Composition 3]

A blue pigment colored composition 3 was prepared as described above except that a triarylmethane pigment (compound No. 5 in Table 1) represented by General Formula (1) shown above was used instead of the triarylmethane pigment used for preparing the blue pigment colored composition 2.

[Yellow Pigment Colored Composition 1]

A yellow pigment colored composition 1 was prepared as described above except that 10 parts of the yellow pigment 1 (C. I. Pigment Yellow 150, FANCHON FAST YELLOW E4GN produced by LANXESS) was used instead of 10 parts of the red pigment 1 used for preparing the red pigment colored composition 1.

[Red Dye Colored Composition 1]

Into a plastic bottle, 10 parts of a red dye 1 (C. I. Solvent Red 1), 55 parts of propylene glycol monomethyl ether acetate, and 0.3-to-0.4-mmϕseppel beads were charged. Dispersion was conducted for 4 hours using a Paint Conditioner (produced by Toyo Seiki Kogyo Co., Ltd.) and filtered through a 5-μm filter. Thus, a dye colored liquid was prepared. A mixture of 75.00 parts of the dye colored liquid, 5.50 parts of a polyester acrylate (ARONIX (trade name) M7100, produced by TOAGOSEI CO., LTD.), 5.00 parts of dipentaerythritol hexaacrylate (KAYARAD (trade name) DPHA, produced by Nippon Kayaku Co., Ltd.), 1.00 parts of benzophenone (KAYACURE (trade name) BP-100, produced by Nippon Kayaku Co., Ltd.), and 13.5 parts of UCAR ester EEP was stirred with a dispersion stirrer and filtered through a filter having a pore size of 1.0 μm. Thus, a red dye colored composition 1 was prepared.

[Green Dye Colored Composition 1]

A green dye colored composition 1 was prepared as described above except that 3 parts of a blue dye 1 (C. I. Solvent Blue 67) and 7 parts of a yellow dye 1 (C. I. Solvent Yellow 162) were used instead of 10 parts of the red dye 1 used for preparing the red dye colored composition 1.

[Green Dye Colored Composition 2]

A green dye colored composition 2 was prepared as described above except that 4 parts of the yellow dye 1 (C. I. Solvent Yellow 162) and 3 parts of a yellow dye 3 (C. I. Solvent Yellow 82) were used instead of 7 parts of the yellow dye 1 used for preparing the green dye colored composition 1.

[Green Dye Colored Composition 3]

A green dye colored composition 3 was prepared as described above except that 10 parts of a green dye 1 (C. I. Solvent Green 7) was used instead of 3 parts of the blue dye 1 and 7 parts of the yellow dye 1 used for preparing the green dye colored composition 1.

[Yellow Dye Colored Composition 1]

A yellow dye colored composition 1 was prepared as described above except that 10 parts of a yellow dye 4 (C. I. Solvent Yellow 21) was used instead of 10 parts of the red dye 1 used for preparing the red dye colored composition 1.

[Yellow Dye Colored Composition 2]

A yellow dye colored composition 2 was prepared as described above except that 10 parts of a yellow dye 4 (C. I. Solvent Yellow 2) was used instead of 10 parts of the yellow dye 1 used for preparing the yellow dye colored composition 1.

[Blue Dye Colored Composition 1]

A blue dye colored composition 1 was prepared as described above except that 10 parts of a blue dye 2 (C. I. Solvent Blue 7) was used instead of the red dye 1 used for preparing the red dye colored composition 1.

[Blue Dye Colored Composition 2]

A blue dye colored composition 2 was prepared as described above except that 10 parts of a blue dye 2 (C. I. Solvent Blue 12) was used instead of 10 parts of the blue dye 1 used for preparing the blue dye colored composition 1.

[Preparation of Color Filter]

The red colored composition was applied onto a glass substrate, on which a black matrix had been deposited, by spin coating so as to form a film having a thickness of 2 μm. After being dried at 70° C. for 20 minutes, the resulting glass substrate was exposed to ultraviolet rays through a photo mask using an exposure machine including an extra-high pressure mercury lamp to form a striped pattern. Spray development was performed using an alkali developing solution for 90 seconds. The resulting glass substrate was washed with ion-exchanged water and then air-dried. Subsequently, postbaking was performed in a clean oven at 230° C. for 30 minutes. Thus, red pixels constituted by a colored layer having a striped pattern were formed on the transparent substrate.

In the same manner, the green colored composition was applied onto the glass substrate by spin coating so as to form a film having a thickness of 2 μm. After being dried, the resulting glass substrate was exposed to light using an exposure machine. Then, development was performed to form a colored layer having a striped pattern at positions displaced from those of the red pixels. Thus, green pixels adjacent to the red pixels were formed.

In the same manner, the blue colored composition was formed into a film having a thickness of 2 μm by spin coating, and blue pixels adjacent to the red pixels and the green pixels were formed. Thus, a color filter including red, green, and yellow three-colored pixels having a striped pattern formed on the transparent substrate was prepared.

As needed, in the same manner, the yellow colored composition was formed into a film having a thickness of 2 μm by spin coating, and yellow pixels adjacent to green pixels and blue pixels were formed. Thus, a color filter including four-colored pixels of red, green, blue, and yellow having a striped pattern formed on the transparent substrate was prepared.

Color filters 1 to 4 and a comparative color filter 1 were prepared using the dye colored composition or the pigment colored composition shown in Table 8.

TABLE 8

|  | Color filter 1 | Color filter 2 | Color filter 3 | Color filter 4 | Comparative color filter 1 |
|---|---|---|---|---|---|
| R pixel portion | Red pigment colored composition1 | Red pigment colored composition2 | Red pigment colored composition3 | Red pigment colored composition4 | Red dye colored composition1 |
| G pixel portion | Green dye colored composition1 | Green dye colored composition2 | Green pigment colored composition1 | Green pigment colored composition2 | Green dye colored composition3 |
| B pixel portion | Blue dye colored composition1 | Blue pigment colored composition1 | Blue pigment colored composition2 | Blue pigment colored composition3 | Blue dye colored composition2 |
| Y pixel portion | None | Yellow dye colored composition1 | None | Yellow pigment colored composition1 | Yellow dye colored composition2 |

Examples 1 to 4

Electrode structures were formed on the first and second substrates, and alignment films having a vertical alignment were formed on surfaces of the first substrate and the second substrate which face each other. Subsequently, a weak rubbing treatment was performed to form VA cells. A liquid crystal composition 1 shown in Table 9, which had negative dielectric anisotropy, was held between the first substrate and the second substrate. Then, liquid crystal display devices of Examples 1 to 4 ($d_{gap}$=3.5 μm, alignment film SE-5300) were prepared using the color filters 1 to 4 shown in Table 8. The VHR and ID of each liquid crystal display device were determined. Each liquid crystal display device was evaluated in terms of burn-in. Table 10 shows the results.

TABLE 9

|  | Liquid crystal composition 1 |
|---|---|
| 0d1-Cy-Cy-3 | 20 |
| 3-Cy-Cy-2 | 15 |
| 3-Cy-Ph—O1 | 5 |
| 0d1-Cy-1O—Ph5—O1-Cy-2 | 11 |
| 0d1-Cy-1O—Ph5—O1-Cy-3 | 11 |
| 0d1-Cy-1O—Ph5—O1-Cy-4 | 11 |
| 0d1-Cy-1O—Ph5—O1-Cy-5 | 11 |
| 0d1-Cy-Cy-1O—Ph5—O3d0 | 4 |
| 0d1-Cy-Cy-1O—Ph5—O4d0 | 4 |

TABLE 9-continued

| | Liquid crystal composition 1 |
|---|---|
| 0d1-Cy-1O—Ph5—O1-Cy-Cy-2 | 4 |
| 0d1-Cy-1O—Ph5—O1-Cy-Cy-3 | 4 |
| Composition ratio total (%) | 100 |
| Tni/° C. | 82.4 |
| Δn (20° C.) | 0.074 |
| η 20/mPa · s | 16.1 |
| Δε (20° C.) | −4.7 |

TABLE 10

| | Example 1 | Example 2 | Example 3 | Example 4 |
|---|---|---|---|---|
| Liquid crystal composition | Liquid crystal composition 1 | Liquid crystal composition 1 | Liquid crystal composition 1 | Liquid crystal composition 1 |
| Color filter | Color filter 1 | Color filter 2 | Color filter 3 | Color filter 4 |
| VHR | 99.0 | 99.1 | 99.4 | 99.5 |
| ID | 76 | 64 | 22 | 17 |
| Burn-in | Good | Good | Excellent | Excellent |

In the liquid crystal display devices of Examples 1 to 4, a high VHR and a small ID were realized. In the evaluation of burn-in, a residual image was absent. In another case, a residual image was present, but it was very slight and at an acceptable level.

Comparative Examples 1 to 8

Liquid crystal display devices of Comparative Examples 1 to 8 were prepared by holding a comparative liquid crystal composition 1 or a comparative liquid crystal composition 2 shown in Table 11, which had negative dielectric anisotropy, between the VA cells used in Example 1 and using any one of the color filters 1 to 4 shown in Table 8. The VHR and ID of each liquid crystal display device were determined. Each liquid crystal display device was evaluated in terms of burn-in. Tables 12 and 13 show the results.

TABLE 11

| | Comparative liquid crystal composition 1 | Comparative liquid crystal composition 2 |
|---|---|---|
| 0d1-Cy-Cy-3 | 20 | 20 |
| 3-Cy-Cy-2 | 15 | 14 |
| 3-Cy-Ph—O1 | 5 | 5 |
| 0d1-Cy-1O—Ph15—O1-Cy-2 | 8 | 8 |
| 0d1-Cy-1O—Ph15—O1-Cy-3 | 8 | 8 |
| 0d1-Cy-1O—Ph15—O1-Cy-4 | 10 | 10 |
| 0d1-Cy-1O—Ph15—O1-Cy-5 | 10 | 10 |
| 0d1-Cy-Cy-1O—Ph15—O3d0 | 4 | 4 |
| 0d1-Cy-Cy-1O—Ph15—O4d0 | 4 | 4 |
| 0d1-Cy-1O—Ph15—O1-Cy-Cy-2 | 4 | 4 |
| 0d1-Cy-1O—Ph15—O1-Cy-Cy-3 | 4 | 4 |
| 3-Cy-Oc-Ph15—O1 | | 8 |
| 3-Cy-Cb1-Ph15—O2 | 3 | |
| 5-Cy-Cb1-Ph15—O2 | 3 | |
| 5-Cy-Cb-Ph15—O2 | 2 | |
| Composition ratio total (%) | 100 | 100 |
| Tni/° C. | 81.9 | 81.3 |
| Δn (20° C.) | 0.073 | 0.074 |
| η 20/mPa · s | 17.3 | 16.8 |
| Δε (20° C.) | −4.6 | −4.7 |

TABLE 12

| | Comparative example 1 | Comparative example 2 | Comparative example 3 | Comparative example 4 |
|---|---|---|---|---|
| Liquid crystal composition | Comparative liquid crystal composition 1 | Comparative liquid crystal composition 1 | Comparative liquid crystal composition 1 | Comparative liquid crystal composition 1 |
| Color filter | Color filter 1 | Color filter 2 | Color filter 3 | Color filter 4 |
| VHR | 98.2 | 98.3 | 98.6 | 98.8 |
| ID | 141 | 125 | 118 | 112 |
| Burn-in | Failure | Failure | Failure | Poor |

TABLE 13

| | Comparative example 5 | Comparative example 6 | Comparative example 7 | Comparative example 8 |
|---|---|---|---|---|
| Liquid crystal composition | Comparative liquid crystal composition 2 | Comparative liquid crystal composition 2 | Comparative liquid crystal composition 2 | Comparative liquid crystal composition 2 |
| Color filter | Color filter 1 | Color filter 2 | Color filter 3 | Color filter 4 |
| VHR | 98.1 | 98.3 | 98.5 | 98.6 |
| ID | 154 | 131 | 121 | 116 |
| Burn-in | Failure | Failure | Failure | Failure |

The liquid crystal display devices of Comparative Examples 1 to 8 had a lower VHR and a higher ID than the liquid crystal display devices according to the present invention. In the evaluation of burn-in, occurrence of a residual image was observed, which was not at an acceptable level.

Comparative Example 9

A liquid crystal display device of Comparative Example 9 was prepared by holding the liquid crystal composition 1 shown in Table 9, which had negative dielectric anisotropy, between the VA cells used in Example 1 and using the comparative color filter 1 shown in Table 8. The VHR and ID of the liquid crystal display device were determined. The liquid crystal display device was evaluated in terms of burn-in. Table 14 shows the results.

TABLE 14

| | Comparative example 9 |
|---|---|
| Liquid crystal composition | Liquid crystal composition 1 |
| Color filter | Comparative color filter 1 |
| VHR | 97.7 |
| ID | 208 |
| Burn-in | Failure |

The liquid crystal display device of Comparative Example 9 had a lower VHR and a higher ID than the liquid crystal display devices according to the present invention. In the evaluation of burn-in, occurrence of a residual image was observed, which was not at an acceptable level.

Comparative Examples 10 to 13

Liquid crystal display devices of Comparative Examples 10 to 13 were prepared by holding a comparative liquid crystal composition 3 shown in Table 15, which had negative dielectric anisotropy, between the VA cells used in Example 1 and using any one of the color filters 1 to 4 shown in Table 8. The VHR and ID of each liquid crystal display device were determined. Each liquid crystal display device was evaluated in terms of burn-in. Table 16 shows the results.

TABLE 15

|  | Comparative liquid crystal composition 3 |
|---|---|
| 3-Cy-Ph15—O4 | 11 |
| 5-Cy-Ph15—O4 | 11 |
| 2-Cy-Cy-Ph15-1 | 12 |
| 2-Cy-Cy-Ph15—O2 | 9 |
| 3-Cy-Cb1-Ph15—O2 | 4 |
| 3-Cy-Cy-Ph15-1 | 12 |
| 3-Cy-Cy-Ph15—O2 | 9 |
| 5-Cy-Cb1-Ph15—O2 | 6 |
| 5-Cy-Cb-Ph15—O2 | 18 |
| 5-Cy-Cy-Ph15—O2 | 8 |
| Composition ratio total (%) | 100 |
| Tni/° C. | 118.1 |
| Δn (20° C.) | 0.105 |
| ne (20° C.) | 1.586 |
| Δε (20° C.) | −6.4 |
| ε⊥ (20° C.) | 10.4 |
| K3/K1 (20° C.) | 1.05 |
| K1/pN (20° C.) | 20.2 |

TABLE 16

|  | Comparative example 10 | Comparative example 11 | Comparative example 12 | Comparative example 13 |
|---|---|---|---|---|
| Liquid crystal composition | Comparative liquid crystal composition 3 | Comparative liquid crystal composition 3 | Comparative liquid crystal composition 3 | Comparative liquid crystal composition 3 |
| Color filter | Color filter 1 | Color filter 2 | Color filter 3 | Color filter 4 |
| VHR | 98.2 | 98.5 | 98.6 | 98.6 |
| ID | 139 | 126 | 110 | 105 |
| Burn-in | Failure | Failure | Poor | Poor |

The liquid crystal display devices of Comparative Examples 10 to 13 had a lower VHR and a higher ID than the liquid crystal display devices according to the present invention. In the evaluation of burn-in, occurrence of a residual image was observed, which was not at an acceptable level.

Examples 5 to 12

Liquid crystal display devices of Examples 5 to 12 were prepared by holding any one of the liquid crystals shown in Table 17, which had negative dielectric anisotropy, as in Example 1 and using any one of the color filters shown in Table 8. The VHR and ID of each liquid crystal display device were determined. Each liquid crystal display device was evaluated in terms of burn-in. Tables 18 and 19 show the results.

TABLE 17

|  | Liquid crystal composition 2 | Liquid crystal composition 3 |
|---|---|---|
| 3-Cy-1O—Ph5—O2 | 11 | 11 |
| 5-Cy-1O—Ph5—O2 | 10 | 10 |
| 0d1-Cy-Cy-3 | 20 |  |
| 0d1-Cy-Cy-5 |  | 20 |
| 0d3-Cy-Cy-3 | 10 | 10 |
| 3-Cy-1=1-Cy-3 | 10 | 10 |
| 0d1-Cy-1O—Ph5—O1-Cy-3 |  | 5 |
| 0d1-Cy-Cy-1O—Ph5—O3d0 |  | 5 |
| 0d1-Cy-Cy-1O—Ph5—O4d0 |  | 5 |
| 2-Cy-Cy-1O—Ph5—O2 | 5 | 5 |
| 3-Cy-Cy-1O—Ph5—O2 | 12 | 12 |
| 4-Cy-Cy-1O—Ph5—O2 | 5 | 5 |
| 0d1-Cy-1O—Ph5—O1-Cy-Cy-1d0 | 12 |  |
| 0d1-Cy-1O—Ph5—O1-Cy-Cy-2 | 5 |  |
| 0d1-Cy-1O—Ph5—O1-Cy-Cy-3 |  | 2 |
| Composition ratio total (%) | 100 | 100 |
| Tni/° C. | 79.6 | 78.9 |
| Δn (20° C.) | 0.074 | 0.075 |
| η 20/mPa · s | 17.8 | 18.2 |
| Δε (20° C.) | −4.8 | −4.8 |

TABLE 18

|  | Example 5 | Example 6 | Example 7 | Example 8 |
|---|---|---|---|---|
| Liquid crystal composition | Liquid crystal composition 2 | Liquid crystal composition 2 | Liquid crystal composition 2 | Liquid crystal composition 2 |
| Color filter | Color filter 1 | Color filter 2 | Color filter 3 | Color filter 4 |
| VHR | 99.0 | 99.2 | 99.5 | 99.7 |
| ID | 73 | 68 | 19 | 14 |
| Burn-in | Good | Excellent | Excellent | Excellent |

TABLE 19

|  | Example 9 | Example 10 | Example 11 | Example 12 |
|---|---|---|---|---|
| Liquid crystal composition | Liquid crystal composition 3 | Liquid crystal composition 3 | Liquid crystal composition 3 | Liquid crystal composition 3 |
| Color filter | Color filter 1 | Color filter 2 | Color filter 3 | Color filter 4 |
| VHR | 99.0 | 99.1 | 99.4 | 99.6 |
| ID | 79 | 71 | 25 | 18 |
| Burn-in | Good | Good | Excellent | Excellent |

In the liquid crystal display devices of Examples 5 to 12, a high VHR and a small ID were realized. In the evaluation of burn-in, a residual image was absent. In another case, a residual image was present, but it was very slight and at an acceptable level.

Examples 13 to 28

Liquid crystal display devices of Examples 13 to 28 were prepared by holding any one of the liquid crystals shown in Table 20, which had negative dielectric anisotropy, as in Example 1 and using any one of the color filters shown in Table 8. The VHR and ID of each liquid crystal display device were determined. Each liquid crystal display device was evaluated in terms of burn-in. Tables 21 to 24 show the results.

TABLE 20

|  | Liquid crystal composition 4 | Liquid crystal composition 5 | Liquid crystal composition 6 | Liquid crystal composition 7 |
|---|---|---|---|---|
| 0d1-Cy-1O—Ph5—O3d0 |  |  |  | 5 |
| 0d1-Cy-1O—Ph5—O4d0 |  |  |  | 5 |
| 0d1-Cy-Cy-3 | 10 |  |  | 4 |
| 3-Cy-Cy-2 | 10 | 18 |  | 10 |
| 3-Cy-Cy-4 |  | 6 | 15 | 3 |
| 3-Cy-Ph—O2 | 12 | 12 | 15 | 4 |
| 5-Ph—Ph-1 | 10 | 3 | 3 | 10 |
| 0d1-Cy-1O—Ph5—O1-Cy-2 | 10 | 10 | 10 |  |
| 0d1-Cy-1O—Ph5—O1-Cy-3 | 12 | 12 | 12 |  |
| 0d1-Cy-1O—Ph5—O1-Cy-4 | 12 | 12 | 12 |  |
| 0d1-Cy-1O—Ph5—O1-Cy-5 | 10 | 10 | 10 |  |
| 0d1-Cy-Cy-1O—Ph5—O1d0 |  |  |  | 10 |
| 0d1-Cy-Cy-1O—Ph5—O2d0 |  |  |  | 10 |
| 0d1-Cy-Cy-1O—Ph5—O3d0 |  |  |  | 15 |
| 0d1-Cy-Cy-1O—Ph5—O4d0 |  |  |  | 15 |
| 3-Cy-Cy-Ph-1 | 6 | 3 |  | 6 |
| 0d1-Cy-1O—Ph5—O1-Cy-Cy-2 | 4 | 4 | 4 |  |
| 0d1-Cy-1O—Ph5—O1-Cy-Cy-3 | 4 | 4 | 4 |  |
| Composition ratio total (%) | 100 | 100 | 100 | 100 |
| Tni/° C. | 75.5 | 81.8 | 83.5 | 75.1 |
| Δn (20° C.) | 0.088 | 0.077 | 0.078 | 0.087 |
| η 20/mPa·s | 16 | 16.5 | 20.2 | 15.5 |
| Δε (20° C.) | −4.2 | −4.2 | −4.2 | −4.3 |

TABLE 21

|  | Example 13 | Example 14 | Example 15 | Example 16 |
|---|---|---|---|---|
| Liquid crystal composition | Liquid crystal composition 4 | Liquid crystal composition 4 | Liquid crystal composition 4 | Liquid crystal composition 4 |
| Color filter | Color filter 1 | Color filter 2 | Color filter 3 | Color filter 4 |
| VHR | 99.0 | 99.2 | 99.4 | 99.5 |
| ID | 69 | 56 | 22 | 18 |
| Burn-in | Excellent | Excellent | Excellent | Excellent |

TABLE 22

|  | Example 17 | Example 18 | Example 19 | Example 20 |
|---|---|---|---|---|
| Liquid crystal composition | Liquid crystal composition 5 | Liquid crystal composition 5 | Liquid crystal composition 5 | Liquid crystal composition 5 |
| Color filter | Color filter 1 | Color filter 2 | Color filter 3 | Color filter 4 |
| VHR | 99.1 | 99.4 | 99.4 | 99.6 |
| ID | 68 | 61 | 21 | 20 |
| Burn-in | Good | Excellent | Excellent | Excellent |

TABLE 23

|  | Example 21 | Example 22 | Example 23 | Example 24 |
|---|---|---|---|---|
| Liquid crystal composition | Liquid crystal composition 6 | Liquid crystal composition 6 | Liquid crystal composition 6 | Liquid crystal composition 6 |
| Color filter | Color filter 1 | Color filter 2 | Color filter 3 | Color filter 4 |
| VHR | 99.2 | 99.1 | 99.3 | 99.6 |
| ID | 80 | 67 | 27 | 17 |
| Burn-in | Excellent | Good | Excellent | Excellent |

TABLE 24

|  | Example 25 | Example 26 | Example 27 | Example 28 |
|---|---|---|---|---|
| Liquid crystal composition | Liquid crystal composition 7 | Liquid crystal composition 7 | Liquid crystal composition 7 | Liquid crystal composition 7 |
| Color filter | Color filter 1 | Color filter 2 | Color filter 3 | Color filter 4 |
| VHR | 99.0 | 99.2 | 99.3 | 99.5 |
| ID | 88 | 53 | 38 | 23 |
| Burn-in | Good | Excellent | Excellent | Excellent |

In the liquid crystal display devices of Examples 13 to 28, a high VHR and a small ID were realized. In the evaluation of burn-in, a residual image was absent. In another case, a residual image was present, but it was very slight and at an acceptable level.

Examples 29 to 40

Liquid crystal display devices of Examples 29 to 40 were prepared by holding any one of the liquid crystals shown in Table 25, which had negative dielectric anisotropy, as in Example 1 and using any one of the color filters shown in Table 8. The VHR and ID of each liquid crystal display device were determined. Each liquid crystal display device was evaluated in terms of burn-in. Tables 26 to 28 show the results.

TABLE 25

|  | Liquid crystal composition 8 | Liquid crystal composition 9 | Liquid crystal composition 10 |
|---|---|---|---|
| 2-Cy-2-Nd4—O2 |  | 4 | 4 |
| 2-Cy-2-Nd4—O4 |  | 4 | 4 |
| 3-Cy-1O-Ch3-5 | 3 |  |  |
| 3-Cy-1O-Nd4—O4 | 3 | 4 | 4 |
| 5-Cy-1O-Ch3-5 | 3 |  |  |
| 5-Cy-1O—Nd4—O2 | 2 |  |  |
| 5-Cy-1O—Nd4—O3 | 3 | 4 | 4 |
| 0d1-Cy-Cy-5 |  | 23 |  |
| 0d3-Cy-Cy-3 |  | 10 |  |
| 1d1-Cy-Cy-3 |  | 8 |  |
| 3-Cy-Cy-2 | 15 |  |  |
| 3-Cy-Cy-4 | 7 | 6 | 22 |
| 3-Cy-Cy-5 | 7 |  | 22 |
| 3-Cy-Ph-2 |  | 15 | 15 |
| 3-Cy-Ph—O1 | 5 |  |  |
| 3-Cy-Ph—O2 | 5 |  |  |
| 5-Ph—Ph-1 | 6 |  |  |
| 2-Cy-Cy-1O—Nd4—O2 | 3 | 4 | 4 |
| 2-Cy-Cy-1O—Nd4—O4 | 2 | 4 | 4 |
| 3-Cy-2-Cy-1O—Nd4—O2 | 4 |  |  |
| 3-Cy-2-Cy-1O—Nd4—O3 | 4 |  |  |
| 3-Cy-Cy-1O-Ch3-5 | 3 |  |  |
| 3-Cy-Cy-1O—Nd4—O4 | 3 | 4 | 4 |
| 4-Cy-Cy-1O-Ch3-5 | 3 |  |  |
| 4-Cy-Cy-1O—Nd4—O2 | 2 | 4 | 4 |
| 4-Cy-Cy-2-Nd4—O2 |  | 6 | 6 |
| 3-Cy-Cy-Ph-1 | 8 |  | 3 |
| Composition ratio total (%) | 100 | 100 | 100 |
| Tni/° C. | 92 | 90 | 91 |
| Δn (20° C.) | 0.093 | 0.092 | 0.093 |
| η 20/mPa·s | 24.9 | 24.1 | 25.5 |
| Δε (20° C.) | −3.3 | −3.2 | −3.2 |

TABLE 26

|  | Example 29 | Example 30 | Example 31 | Example 32 |
|---|---|---|---|---|
| Liquid crystal composition | Liquid crystal composition 8 | Liquid crystal composition 8 | Liquid crystal composition 8 | Liquid crystal composition 8 |

TABLE 26-continued

|  | Example 29 | Example 30 | Example 31 | Example 32 |
|---|---|---|---|---|
| Color filter | Color filter 1 | Color filter 2 | Color filter 3 | Color filter 4 |
| VHR | 98.9 | 99.2 | 99.5 | 99.7 |
| ID | 91 | 74 | 18 | 14 |
| Burn-in | Good | Good | Excellent | Excellent |

TABLE 27

|  | Example 33 | Example 34 | Example 35 | Example 36 |
|---|---|---|---|---|
| Liquid crystal composition | Liquid crystal composition 9 | Liquid crystal composition 9 | Liquid crystal composition 9 | Liquid crystal composition 9 |
| Color filter | Color filter 1 | Color filter 2 | Color filter 3 | Color filter 4 |
| VHR | 99.3 | 99.3 | 99.4 | 99.7 |
| ID | 98 | 65 | 33 | 19 |
| Burn-in | Good | Good | Excellent | Excellent |

TABLE 28

|  | Example 37 | Example 38 | Example 39 | Example 40 |
|---|---|---|---|---|
| Liquid crystal composition | Liquid crystal composition 10 | Liquid crystal composition 10 | Liquid crystal composition 10 | Liquid crystal composition 10 |
| Color filter | Color filter 1 | Color filter 2 | Color filter 3 | Color filter 4 |
| VHR | 99.2 | 99.1 | 99.3 | 99.5 |
| ID | 89 | 87 | 28 | 20 |
| Burn-in | Good | Good | Excellent | Excellent |

In the liquid crystal display devices of Examples 29 to 40, a high VHR and a small ID were realized. In the evaluation of burn-in, a residual image was absent. In another case, a residual image was present, but it was very slight and at an acceptable level.

Examples 41 to 48

Liquid crystal display devices of Examples 41 to 48 were prepared by holding any one of the liquid crystals shown in Table 29, which had negative dielectric anisotropy, as in Example 1 and using any one of the color filters shown in Table 8. The VHR and ID of each liquid crystal display device were determined. Each liquid crystal display device was evaluated in terms of burn-in. Tables 30 and 31 show the results.

TABLE 29

|  | Liquid crystal composition 11 | Liquid crystal composition 12 |
|---|---|---|
| 3-Cy-1O-Ch3-5 | 2 |  |
| 3-Cy-2-Ph5—O2 | 6 | 10 |
| 3-Cy-Ph5—O2 |  | 10 |
| 4-Cy-1O—Nd4—O2 | 5 | 5 |
| 5-Cy-1O-Ch3-5 | 2 |  |
| 0d1-Cy-Cy-5 |  | 16 |
| 3-Cy-1=1-Cy-3 |  | 10 |
| 3-Cy-Cy-2 | 15 |  |
| 3-Cy-Cy-4 | 7 |  |
| 3-Cy-Cy-5 | 7 |  |
| 3-Cy-Ph—O1 | 6 |  |
| 3-Cy-2-Cy-1O—Nd4—O2 | 3 |  |
| 3-Cy-2-Cy-1O—Nd4—O3 | 3 |  |
| 3-Cy-Cy-1O-Ch3-5 | 2 |  |
| 3-Cy-Cy-2-Ph5—O2 | 7 | 10 |
| 3-Cy-Cy-Ph5-1 | 7 | 10 |
| 3-Cy-Cy-Ph5—O2 | 7 | 10 |

TABLE 29-continued

|  | Liquid crystal composition 11 | Liquid crystal composition 12 |
|---|---|---|
| 4-Cy-Cy-1O-Ch3-5 | 2 |  |
| 5-Cy-Cy-1O—Nd4-03 | 5 | 5 |
| 0d1-Cy-Cy-Ph-1 |  | 14 |
| 3-Cy-Cy-Ph-1 | 14 |  |
| Composition ratio total | 100 | 100 |
| Tnin/° C. | 87 | 85 |
| Δn (20° C.) | 0.086 | 0.085 |
| η 20/mPa · s | 24.2 | 23.8 |
| Δε (20° C.) | −2.7 | −2.5 |

TABLE 30

|  | Example 41 | Example 42 | Example 43 | Example 44 |
|---|---|---|---|---|
| Liquid crystal composition | Liquid crystal composition 11 | Liquid crystal composition 11 | Liquid crystal composition 11 | Liquid crystal composition 11 |
| Color filter | Color filter 1 | Color filter 2 | Color filter 3 | Color filter 4 |
| VHR | 99.1 | 99.4 | 99.7 | 99.7 |
| ID | 82 | 77 | 16 | 12 |
| Burn-in | Good | Excellent | Excellent | Excellent |

TABLE 31

|  | Example 45 | Example 46 | Example 47 | Example 48 |
|---|---|---|---|---|
| Liquid crystal composition | Liquid crystal composition 12 | Liquid crystal composition 12 | Liquid crystal composition 12 | Liquid crystal composition 12 |
| Color filter | Color filter 1 | Color filter 2 | Color filter 3 | Color filter 4 |
| VHR | 99.3 | 99.4 | 99.6 | 99.8 |
| ID | 92 | 76 | 19 | 11 |
| Burn-in | Good | Excellent | Excellent | Excellent |

In the liquid crystal display devices of Examples 41 to 48, a high VHR and a small ID were realized. In the evaluation of burn-in, a residual image was absent. In another case, a residual image was present, but it was very slight and at an acceptable level.

Examples 49 to 60

Liquid crystal display devices of Examples 49 to 60 were prepared by holding any one of the liquid crystals shown in Table 32, which had negative dielectric anisotropy, as in Example 1 and using any one of the color filters shown in Table 8. The VHR and ID of each liquid crystal display device were determined. Each liquid crystal display device was evaluated in terms of burn-in. Tables 33 to 35 show the results.

TABLE 32

|  | Liquid crystal composition 13 | Liquid crystal composition 14 | Liquid crystal composition 15 |
|---|---|---|---|
| 3-Cy-1O-Ch3-5 | 3 |  |  |
| 3-Cy-1O—Nd4—O4 | 3 |  | 4 |
| 5-Cy-1O-Ch3-5 | 3 |  |  |
| 5-Cy-1O—Nd4—O2 | 2 | 4 | 4 |
| 5-Cy-1O—Nd4—O3 | 3 | 4 | 4 |
| 3-Cy-Cy-2 | 7 | 21 | 11 |
| 3-Cy-Cy-4 | 11 | 7 | 7 |
| 3-Cy-Cy-5 | 11 | 7 | 7 |
| 3-Cy-Ph-2 |  |  | 6 |

TABLE 32-continued

|  | Liquid crystal composition 13 | Liquid crystal composition 14 | Liquid crystal composition 15 |
|---|---|---|---|
| 3-Cy-Ph—O1 | 7 | 13 | 7 |
| 3-Cy-Ph—O2 | 7 | 13 | 7 |
| 5-Ph—Ph-1 | 6 |  | 13 |
| 2-Cy-Cy-1O—Nd4—O2 | 3 | 4 | 4 |
| 2-Cy-Cy-1O—Nd4—O4 | 2 |  |  |
| 3-Cy-2-Cy-1O—Nd4—O2 | 3 | 4 | 4 |
| 3-Cy-2-Cy-1O—Nd4—O3 | 3 | 4 | 4 |
| 3-Cy-Cy-1O-Ch3-5 | 2 | 3 |  |
| 3-Cy-Cy-1O—Nd4—O4 | 3 | 4 | 4 |
| 4-Cy-Cy-1O-Ch3-5 | 2 | 3 |  |
| 4-Cy-Cy-1O—Nd4—O2 | 2 |  |  |
| 3-Cy-Cy-Ph-1 | 8 | 9 | 6 |
| 3-Cy-Ph—Ph-1 | 9 |  | 6 |
| Composition ratio total (%) | 100 | 100 | 98 |
| Tni/° C. | 86 | 81 | 76 |
| Δn (20° C.) | 0.091 | 0.082 | 0.104 |
| η20/mPa · s | 20 | 19.2 | 17.8 |
| Δε (20° C.) | −2.7 | −2.5 | −2.3 |

TABLE 33

|  | Example 49 | Example 50 | Example 51 | Example 52 |
|---|---|---|---|---|
| Liquid crystal composition | Liquid crystal composition 13 | Liquid crystal composition 13 | Liquid crystal composition 13 | Liquid crystal composition 13 |
| Color filter | Color filter 1 | Color filter 2 | Color filter 3 | Color filter 4 |
| VHR | 99.1 | 99.2 | 99.6 | 99.7 |
| ID | 94 | 75 | 27 | 21 |
| Burn-in | Good | Excellent | Excellent | Excellent |

TABLE 34

|  | Example 53 | Example 54 | Example 55 | Example 56 |
|---|---|---|---|---|
| Liquid crystal composition | Liquid crystal composition 14 | Liquid crystal composition 14 | Liquid crystal composition 14 | Liquid crystal composition 14 |
| Color filter | Color filter 1 | Color filter 2 | Color filter 3 | Color filter 4 |
| VHR | 98.9 | 99.0 | 99.4 | 99.6 |
| ID | 100 | 81 | 38 | 23 |
| Burn-in | Good | Good | Excellent | Excellent |

TABLE 35

|  | Example 57 | Example 58 | Example 59 | Example 60 |
|---|---|---|---|---|
| Liquid crystal composition | Liquid crystal composition 15 | Liquid crystal composition 15 | Liquid crystal composition 15 | Liquid crystal composition 15 |
| Color filter | Color filter 1 | Color filter 2 | Color filter 3 | Color filter 4 |
| VHR | 99.0 | 99.3 | 99.5 | 99.4 |
| ID | 99 | 88 | 38 | 32 |
| Burn-in | Excellent | Good | Excellent | Excellent |

In the liquid crystal display devices of Examples 49 to 60, a high VHR and a small ID were realized. In the evaluation of burn-in, a residual image was absent. In another case, a residual image was present, but it was very slight and at an acceptable level.

Examples 61 to 76

Liquid crystal display devices of Examples 61 to 76 were prepared by holding any one of the liquid crystals shown in Table 36, which had negative dielectric anisotropy, as in Example 1 and using any one of the color filters shown in Table 8. The VHR and ID of each liquid crystal display device were determined. Each liquid crystal display device was evaluated in terms of burn-in. Tables 37 to 40 show the results.

TABLE 36

|  | Liquid crystal composition 16 | Liquid crystal composition 17 | Liquid crystal composition 18 | Liquid crystal composition 19 |
|---|---|---|---|---|
| 3-Cy-1O—Ph5—O2 |  | 2 |  | 11 |
| 5-Cy-1O—Ph5—O2 |  | 2 |  | 10 |
| 0d1-Cy-Cy-3 |  |  | 30 |  |
| 0d1-Cy-Cy-5 | 4 | 4 | 10 | 20 |
| 0d3-Cy-Cy-3 |  |  |  | 10 |
| 3-Cy-1=1-Cy-3 |  |  |  | 10 |
| 3-Cy-Cy-2 | 4 | 4 |  |  |
| 3-Cy-Cy-4 | 4 | 4 |  |  |
| 3-Cy-Cy-5 | 4 | 4 |  |  |
| 3-Cy-Ph—O1 | 2 | 2 |  |  |
| 5-Ph—Ph-1 | 20 | 20 |  |  |
| 0d1-Cy-1O-Ph5—O1-Cy-1d0 |  |  |  | 12 |
| 0d1-Cy-1O—Ph5—O1-Cy-2 | 7 | 8 | 10 |  |
| 0d1-Cy-1O—Ph5—O1-Cy-3 | 7 | 8 | 12 |  |
| 0d1-Cy-1O—Ph5—O1-Cy-4 | 7 | 8 | 12 |  |
| 0d1-Cy-1O—Ph5—O1-Cy-5 | 5 |  | 10 |  |
| 0d1-Cy-Cy-1O—Ph5—O3d0 | 13 |  | 6 |  |
| 0d1-Cy-Cy-1O—Ph5—O4d0 | 13 |  | 6 |  |
| 2-Cy-Cy-1O—Ph5—O2 |  | 13 |  | 5 |
| 3-Cy-Cy-1O—Ph5—O2 |  | 13 |  | 12 |
| 4-Cy-Cy-1O—Ph5—O2 |  | 13 |  | 5 |
| 0d1-Cy-1O—Ph5—O1-Cy-Cy-2 | 5 |  | 2 | 5 |
| 0d1-Cy-1O—Ph5—O1-Cy-Cy-3 | 5 | 5 | 2 |  |
| Composition ratio total (%) | 100 | 110 | 100 | 100 |
| Tni/° C. | 80.5 | 79.8 | 83.6 | 83.1 |
| Δn (20° C.) | 0.102 | 0.101 | 0.075 | 0.075 |
| η 20/mPa · s | 23.9 | 27.6 | 15.1 | 18 |
| Δε (20° C.) | −4.1 | −4.1 | −4.8 | −4.8 |

TABLE 37

|  | Example 61 | Example 62 | Example 63 | Example 64 |
|---|---|---|---|---|
| Liquid crystal composition | Liquid crystal composition 16 | Liquid crystal composition 16 | Liquid crystal composition 16 | Liquid crystal composition 16 |
| Color filter | Color filter 1 | Color filter 2 | Color filter 3 | Color filter 4 |
| VHR | 99.1 | 99.2 | 99.5 | 99.6 |
| ID | 89 | 76 | 34 | 26 |
| Burn-in | Good | Good | Excellent | Excellent |

TABLE 38

|  | Example 65 | Example 66 | Example 67 | Example 68 |
|---|---|---|---|---|
| Liquid crystal composition | Liquid crystal composition 17 | Liquid crystal composition 17 | Liquid crystal composition 17 | Liquid crystal composition 17 |
| Color filter | Color filter 1 | Color filter 2 | Color filter 3 | Color filter 4 |
| VHR | 99.0 | 99.2 | 99.4 | 99.5 |
| ID | 96 | 87 | 39 | 29 |
| Burn-in | Good | Good | Excellent | Excellent |

TABLE 39

|  | Example 69 | Example 70 | Example 71 | Example 72 |
|---|---|---|---|---|
| Liquid crystal composition | Liquid crystal composition 18 | Liquid crystal composition 18 | Liquid crystal composition 18 | Liquid crystal composition 18 |
| Color filter | Color filter 1 | Color filter 2 | Color filter 3 | Color filter 4 |
| VHR | 99.1 | 99.2 | 99.3 | 99.5 |

TABLE 39-continued

|  | Example 69 | Example 70 | Example 71 | Example 72 |
|---|---|---|---|---|
| ID | 92 | 74 | 22 | 17 |
| Burn-in | Good | Excellent | Excellent | Excellent |

TABLE 40

|  | Example 73 | Example 74 | Example 75 | Example 76 |
|---|---|---|---|---|
| Liquid crystal composition | Liquid crystal composition 19 | Liquid crystal composition 19 | Liquid crystal composition 19 | Liquid crystal composition 19 |
| Color filter | Color filter 1 | Color filter 2 | Color filter 3 | Color filter 4 |
| VHR | 99.4 | 99.4 | 99.5 | 99.6 |
| ID | 99 | 84 | 25 | 18 |
| Burn-in | Good | Good | Excellent | Excellent |

In the liquid crystal display devices of Examples 61 to 76, a high VHR and a small ID were realized. In the evaluation of burn-in, a residual image was absent. In another case, a residual image was present, but it was very slight and at an acceptable level.

Examples 77 to 92

Liquid crystal display devices of Examples 77 to 92 were prepared by holding any one of the liquid crystals shown in Table 41, which had negative dielectric anisotropy, as in Example 1 and using any one of the color filters shown in Table 8. The VHR and ID of each liquid crystal display device were determined. Each liquid crystal display device was evaluated in terms of burn-in. Tables 42 to 45 show the results.

TABLE 41

|  | Liquid crystal composition 20 | Liquid crystal composition 21 | Liquid crystal composition 22 | Liquid crystal composition 23 |
|---|---|---|---|---|
| 2-Cy-2-Nd4—O2 |  | 10 |  | 10 |
| 3-Cy-1O—Ch3—O5 | 7 |  | 10 |  |
| 3-Cy-2-Nd4—O4 |  | 10 |  | 10 |
| 4-Cy-2-Nd4—O2 |  | 10 |  | 10 |
| 5-Cy-1O—Ch3—O5 | 7 |  | 10 |  |
| 5-Cy-2-Nd4—O2 |  | 5 |  | 5 |
| 0d1-Cy-Cy-3 | 30 | 40 |  |  |
| 0d1-Cy-Cy-5 |  |  | 15 | 20 |
| 3-Cy-Cy-4 |  |  | 15 | 14 |
| 3-Cy-Ph—O2 |  |  |  | 10 |
| 5-Ph—Ph-1 | 10 |  | 10 |  |
| 2-Cy-Cy-2-Nd4—O2 |  | 4 |  | 4 |
| 3-Cy-Cy-1O—Ph5—O1 | 4 |  | 3 |  |
| 3-Cy-Cy-1O—Ph5—O2 | 9 |  | 5 |  |
| 3-Cy-Cy-2-Ph5—O2 | 10 |  | 10 |  |
| 3-Cy-Cy-Ph5—O2 | 10 |  | 10 |  |
| 4-Cy-Cy-1O—Ph5—O1 | 4 |  | 3 |  |
| 4-Cy-Cy-2-Nd4—O2 |  | 4 |  | 4 |
| 0d1-Cy-Cy—Ph-1 | 9 | 6 | 9 | 4 |
| 0d1-Cy-Ph—Ph-3 |  | 5 |  | 3 |
| 0d3-Cy-Cy-Ph-1 |  | 6 |  | 6 |
| Composition ratio total (%) | 100 | 100 | 100 | 100 |
| Tni/° C. | 82.7 | 82.3 | 80.9 | 81.8 |
| Δn (20° C.) | 0.087 | 0.098 | 0.084 | 0.097 |
| η 20/mPa·s | 19.4 | 18.1 | 26 | 22.7 |
| Δε (20° C.) | −3.1 | −3.1 | −3.1 | −3.2 |

TABLE 42

|  | Example 77 | Example 78 | Example 79 | Example 80 |
| --- | --- | --- | --- | --- |
| Liquid crystal composition | Liquid crystal composition 20 | Liquid crystal composition 20 | Liquid crystal composition 20 | Liquid crystal composition 20 |
| Color filter | Color filter 1 | Color filter 2 | Color filter 3 | Color filter 4 |
| VHR | 99.2 | 99.3 | 99.5 | 99.7 |
| ID | 76 | 67 | 23 | 16 |
| Burn-in | Good | Excellent | Excellent | Excellent |

TABLE 43

|  | Example 81 | Example 82 | Example 83 | Example 84 |
| --- | --- | --- | --- | --- |
| Liquid crystal composition | Liquid crystal composition 21 | Liquid crystal composition 21 | Liquid crystal composition 21 | Liquid crystal composition 21 |
| Color filter | Color filter 1 | Color filter 2 | Color filter 3 | Color filter 4 |
| VHR | 98.8 | 99.1 | 99.5 | 99.7 |
| ID | 104 | 78 | 43 | 35 |
| Burn-in | Good | Good | Excellent | Excellent |

TABLE 44

|  | Example 85 | Example 86 | Example 87 | Example 88 |
| --- | --- | --- | --- | --- |
| Liquid crystal composition | Liquid crystal composition 22 | Liquid crystal composition 22 | Liquid crystal composition 22 | Liquid crystal composition 22 |
| Color filter | Color filter 1 | Color filter 2 | Color filter 3 | Color filter 4 |
| VHR | 99.3 | 99.2 | 99.4 | 99.6 |
| ID | 72 | 68 | 24 | 18 |
| Burn-in | Excellent | Good | Excellent | Excellent |

TABLE 45

|  | Example 89 | Example 90 | Example 91 | Example 92 |
| --- | --- | --- | --- | --- |
| Liquid crystal composition | Liquid crystal composition 23 | Liquid crystal composition 23 | Liquid crystal composition 23 | Liquid crystal composition 23 |
| Color filter | Color filter 1 | Color filter 2 | Color filter 3 | Color filter 4 |
| VHR | 99.0 | 99.1 | 99.3 | 99.5 |
| ID | 105 | 82 | 38 | 21 |
| Burn-in | Good | Good | Excellent | Excellent |

In the liquid crystal display devices of Examples 77 to 92, a high VHR and a small ID were realized. In the evaluation of burn-in, a residual image was absent. In another case, a residual image was present, but it was very slight and at an acceptable level.

Examples 93 to 100

Liquid crystal display devices of Examples 93 to 100 were prepared by holding any one of the liquid crystals shown in Table 46, which had negative dielectric anisotropy, as in Example 1 and using any one of the color filters shown in Table 8. The VHR and ID of each liquid crystal display device were determined. Each liquid crystal display device was evaluated in terms of burn-in. Tables 47 and 48 show the results.

TABLE 46

|  | Liquid crystal composition 24 | Liquid crystal composition 25 |
| --- | --- | --- |
| 3-Cy-Ph5—O4 | 9 | 10 |
| 3O—Ph5—Ph5—O2 | 8 |  |
| 5-Cy-Ph5—O4 | 9 | 10 |
| 0d1-Cy-Cy-5 | 5 |  |
| 0d1-O-Cy-Cy-Ph5-1 |  | 10 |
| 0d2-O-Cy-Cy-Ph5—O2 | 10 |  |
| 0d2-O-Cy-Cy-Ph5-1 |  | 10 |
| 1d2-O-Cy-Cy-Ph5-1 |  | 8 |
| 2-Cy-Cy-Ph5-1 | 11 | 12 |
| 2-Cy-Cy-Ph5—O2 | 9 | 10 |
| 3-Cy-Cy-Ph5-1 | 10 | 11 |
| 3-Cy-Cy-Ph5—O2 | 10 | 10 |
| 3-O-Cy-Cy-Ph5—O2 | 10 |  |
| 5-Cy-Cy-Ph5—O2 | 9 | 9 |
| Composition ratio total (%) | 100 | 100 |
| Tni/° C. | 101.2 | 103.9 |
| Δn (20° C.) | 0.100 | 0.098 |
| ne (20° C.) | 1.581 | 1.579 |
| Δε (20° C.) | 7.5 | −5.5 |
| ε⊥ (20° C.) | 11.9 | 9.5 |
| K3/K1 (20° C.) | 1.08 | 1.16 |
| K1/pN (20° C.) | 15.8 | 16.5 |

TABLE 47

|  | Example 93 | Example 94 | Example 95 | Example 96 |
| --- | --- | --- | --- | --- |
| Liquid crystal composition | Liquid crystal composition 24 | Liquid crystal composition 24 | Liquid crystal composition 24 | Liquid crystal composition 24 |
| Color filter | Color filter 1 | Color filter 2 | Color filter 3 | Color filter 4 |
| VHR | 99.3 | 99.3 | 99.5 | 99.8 |
| ID | 62 | 58 | 33 | 12 |
| Burn-in | Excellent | Excellent | Excellent | Excellent |

TABLE 48

|  | Example 97 | Example 98 | Example 99 | Example 100 |
| --- | --- | --- | --- | --- |
| Liquid crystal composition | Liquid crystal composition 25 | Liquid crystal composition 25 | Liquid crystal composition 25 | Liquid crystal composition 25 |
| Color filter | Color filter 1 | Color filter 2 | Color filter 3 | Color filter 4 |
| VHR | 99.2 | 99.3 | 99.4 | 99.7 |
| ID | 68 | 62 | 37 | 18 |
| Burn-in | Excellent | Excellent | Excellent | Excellent |

In the liquid crystal display devices of Examples 93 to 100, a high VHR and a small ID were realized. In the evaluation of burn-in, a residual image was absent. In another case, a residual image was present, but it was very slight and at an acceptable level.

Examples 101 to 112

Liquid crystal display devices of Examples 101 to 112 were prepared by holding any one of the liquid crystals shown in Table 49, which had negative dielectric anisotropy, as in Example 1 and using any one of the color filters shown in Table 8. The VHR and ID of each liquid crystal display device were determined. Each liquid crystal display device was evaluated in terms of burn-in. Tables 50 to 52 show the results.

TABLE 49

|  | Liquid crystal composition 26 | Liquid crystal composition 27 | Liquid crystal composition 28 |
|---|---|---|---|
| 3-Cy-Ph5—O4 | 16 | 16 | 16 |
| 5-Cy-Ph5—O2 | 12 | 16 | 16 |
| 0d1-Cy-Cy-5 | 7 | 4 | 10 |
| 0d3-Ph—Ph-1 | 11 | 10 | 10 |
| 1d1-Cy-Cy-3 | 9 | 8 |  |
| 2-Cy-Ph—Ph5—O2 | 13 | 12 | 12 |
| 3-Cy-Cy-Ph5—O2 | 6 | 7 | 10 |
| 3-Cy-Ph—Ph5—O2 | 12 | 12 | 12 |
| 0d1-Cy-Cy-Ph-1 | 4 | 4 | 4 |
| 3-Cy-Ph—Ph-2 | 10 | 11 | 10 |
| Composition ratio total | 100 | 100 | 100 |
| Tni/° C. | 80.2 | 80.3 | 80.9 |
| Δn (20° C.) | 0.128 | 0.129 | 0.126 |
| ne (20° C.) | 1.492 | 1.491 | 1.491 |
| Δε (20° C.) | −3.3 | −3.5 | −3.7 |
| ε⊥ (20° C.) | 6.8 | 7.1 | 7.4 |
| K3/K1 (20° C.) | 0.99 | 1.01 | 1.04 |
| K1/pN (20° C.) | 16.7 | 15.2 | 16.4 |

TABLE 50

|  | Example 101 | Example 102 | Example 103 | Example 104 |
|---|---|---|---|---|
| Liquid crystal composition | Liquid crystal composition 26 | Liquid crystal composition 26 | Liquid crystal composition 26 | Liquid crystal composition 26 |
| Color filter | Color filter 1 | Color filter 2 | Color filter 3 | Color filter 4 |
| VHR | 99.3 | 99.1 | 99.6 | 99.6 |
| ID | 89 | 57 | 32 | 24 |
| Burn-in | Excellent | Excellent | Excellent | Excellent |

TABLE 51

|  | Example 105 | Example 106 | Example 107 | Example 108 |
|---|---|---|---|---|
| Liquid crystal composition | Liquid crystal composition 27 | Liquid crystal composition 27 | Liquid crystal composition 27 | Liquid crystal composition 27 |
| Color filter | Color filter 1 | Color filter 2 | Color filter 3 | Color filter 4 |
| VHR | 99.2 | 99.1 | 99.5 | 99.6 |
| ID | 80 | 42 | 30 | 23 |
| Burn-in | Good | Excellent | Excellent | Excellent |

TABLE 52

|  | Example 109 | Example 110 | Example 111 | Example 112 |
|---|---|---|---|---|
| Liquid crystal composition | Liquid crystal composition 28 | Liquid crystal composition 28 | Liquid crystal composition 28 | Liquid crystal composition 28 |
| Color filter | Color filter 1 | Color filter 2 | Color filter 3 | Color filter 4 |
| VHR | 99.1 | 99.2 | 99.4 | 99.5 |
| ID | 81 | 55 | 34 | 27 |
| Burn-in | Excellent | Excellent | Excellent | Excellent |

In the liquid crystal display devices of Examples 101 to 112, a high VHR and a small ID were realized. In the evaluation of burn-in, a residual image was absent. In another case, a residual image was present, but it was very slight and at an acceptable level.

Examples 113 to 124

Liquid crystal display devices of Examples 113 to 124 were prepared by holding any one of the liquid crystals shown in Table 53, which had negative dielectric anisotropy, as in Example 1 and using any one of the color filters shown in Table 8. The VHR and ID of each liquid crystal display device were determined. Each liquid crystal display device was evaluated in terms of burn-in. Tables 54 to 56 show the results.

TABLE 53

|  | Liquid crystal composition 29 | Liquid crystal composition 30 | Liquid crystal composition 31 |
|---|---|---|---|
| 3-Cy-Ph5—O4 | 16 | 16 | 16 |
| 5-Cy-Ph5—O2 | 12 | 16 | 16 |
| 0d1-Cy-Cy-5 | 12 | 10 | 20 |
| 0d3-Ph—Ph-1 | 6 | 4 |  |
| 1d1-Cy-Cy-3 | 9 | 8 |  |
| 2-Ph—Ph5—Ph-2 | 13 | 12 | 12 |
| 3-Cy-Cy-Ph5—O2 | 6 | 7 | 10 |
| 3-Cy-Ph—Ph5—O2 | 12 | 12 | 12 |
| 0d1-Cy-Cy-Ph-1 | 4 | 4 | 4 |
| 3-Cy-Ph—Ph-2 | 10 | 11 | 10 |
| Composition ratio total | 100 | 100 | 100 |
| Tni/° C. | 81.7 | 81.2 | 80.9 |
| Δn (20° C.) | 0.127 | 0.130 | 0.131 |
| ne (20° C.) | 1.494 | 1.495 | 1.498 |
| Δε (20° C.) | −3.0 | −3.3 | −3.6 |
| ε⊥ (20° C.) | 6.9 | 7.2 | 7.5 |
| K3/K1 (20° C.) | 1.02 | 1.03 | 1.06 |
| K1/pN (20° C.) | 15.8 | 15.6 | 16.2 |

TABLE 54

|  | Example 113 | Example 114 | Example 115 | Example 116 |
|---|---|---|---|---|
| Liquid crystal composition | Liquid crystal composition 29 | Liquid crystal composition 29 | Liquid crystal composition 29 | Liquid crystal composition 29 |
| Color filter | Color filter 1 | Color filter 2 | Color filter 3 | Color filter 4 |
| VHR | 99.2 | 99.3 | 99.5 | 99.7 |
| ID | 76 | 50 | 29 | 17 |
| Burn-in | Excellent | Excellent | Excellent | Excellent |

TABLE 55

|  | Example 117 | Example 118 | Example 119 | Example 120 |
|---|---|---|---|---|
| Liquid crystal composition | Liquid crystal composition 30 | Liquid crystal composition 30 | Liquid crystal composition 30 | Liquid crystal composition 30 |
| Color filter | Color filter 1 | Color filter 2 | Color filter 3 | Color filter 4 |
| VHR | 99.2 | 99.2 | 99.5 | 99.6 |
| ID | 62 | 46 | 27 | 19 |
| Burn-in | Good | Good | Excellent | Excellent |

TABLE 56

|  | Example 121 | Example 122 | Example 123 | Example 124 |
|---|---|---|---|---|
| Liquid crystal composition | Liquid crystal composition 31 | Liquid crystal composition 31 | Liquid crystal composition 31 | Liquid crystal composition 31 |
| Color filter | Color filter 1 | Color filter 2 | Color filter 3 | Color filter 4 |
| VHR | 99.2 | 99.3 | 99.6 | 99.8 |
| ID | 87 | 73 | 38 | 21 |
| Burn-in | Good | Good | Excellent | Excellent |

In the liquid crystal display devices of Examples 113 to 124, a high VHR and a small ID were realized. In the evaluation of burn-in, a residual image was absent. In another case, a residual image was present, but it was very slight and at an acceptable level.

Examples 125 to 128

Liquid crystal display devices of Examples 125 to 128 were prepared by holding any one of the liquid crystals shown in Table 57, which had negative dielectric anisotropy, as in Example 1 and using any one of the color filters shown in Table 8. The VHR and ID of each liquid crystal display device were determined. Each liquid crystal display device was evaluated in terms of burn-in. Table 58 shows the results.

TABLE 57

|  | Liquid crystal composition 32 |
| --- | --- |
| 0d1-Cy-Cy-5 | 20 |
| 3-Cy-2-Ph5—O2 | 20 |
| 0d1-Cy-Cy-Ph-1 | 5 |
| 5-Cy-2-Ph5—O2 | 20 |
| 3-Cy-Cy-2-Ph5—O2 | 3 |
| 5-Cy-Cy-Ph5—O2 | 3 |
| 3-Cy-Ph—Ph5—O2 | 5 |
| 3-Ph—Ph—Ph-2 | 7 |
| 4-Ph—Ph—Ph-2 | 7 |
| 3-Cy-Cy-VO—Ph-Cy-3 | 4 |
| 3-Cy-Cy-VO—Ph-Cy-4 | 3 |
| 3-Cy-Cy-VO—Ph-Cy-5 | 3 |
| Composition ratio total | 100 |
| Tni/° C. | 81.6 |
| Δn (20° C.) | 0.127 |
| ne (20° C.) | 1.495 |
| Δε (20° C.) | −3.0 |

TABLE 58

|  | Example 125 | Example 126 | Example 127 | Example 128 |
| --- | --- | --- | --- | --- |
| Liquid crystal composition | Liquid crystal composition 32 | Liquid crystal composition 32 | Liquid crystal composition 32 | Liquid crystal composition 32 |
| Color filter | Color filter 1 | Color filter 2 | Color filter 3 | Color filter 4 |
| VHR | 99.1 | 99.4 | 99.5 | 99.6 |
| ID | 80 | 59 | 36 | 27 |
| Burn-in | Good | Excellent | Excellent | Excellent |

In the liquid crystal display devices of Examples 125 to 128, a high VHR and a small ID were realized. In the evaluation of burn-in, a residual image was absent. In another case, a residual image was present, but it was very slight and at an acceptable level.

Examples 129 to 132

A liquid crystal composition 33 was prepared by mixing 0.3% by mass of 2-methyl-acrylic acid 4'-{2-[4-(2-acryloyloxy-ethyl)-phenoxycarbonyl]-ethyl}-biphenyl-4-yl ester in the liquid crystal composition 1 having negative dielectric anisotropy used in Example 1. The liquid crystal composition 33 was held between the VA cells used in Example 1. While a driving voltage is applied between the electrodes, ultraviolet irradiation (3.0 J/cm$^2$) was done for 600 seconds to perform a polymerization treatment. Subsequently, liquid crystal display devices of Examples 129 to 132 were prepared using the color filters 1 to 4 shown in Table 8. The VHR and ID of each liquid crystal display device were determined. Each liquid crystal display device was evaluated in terms of burn-in. Table 59 shows the results.

TABLE 59

|  | Example 129 | Example 130 | Example 131 | Example 132 |
| --- | --- | --- | --- | --- |
| Liquid crystal composition | Liquid crystal composition 33 | Liquid crystal composition 33 | Liquid crystal composition 33 | Liquid crystal composition 33 |
| Color filter | Color filter 1 | Color filter 2 | Color filter 3 | Color filter 4 |
| VHR | 98.9 | 99.0 | 99.2 | 99.3 |
| ID | 76 | 63 | 40 | 22 |
| Burn-in | Good | Good | Excellent | Excellent |

In the liquid crystal display devices of Examples 129 to 132, a high VHR and a small ID were realized. In the evaluation of burn-in, a residual image was absent. In another case, a residual image was present, but it was very slight and at an acceptable level.

Examples 133 to 136

A liquid crystal composition 34 was prepared by mixing 0.3% by mass of bismethacrylic acid biphenyl-4,4'-diyl in the liquid crystal composition 29 having negative dielectric anisotropy. The liquid crystal composition 34 was held between the VA cells used in Example 1. While a driving voltage is applied between the electrodes, ultraviolet irradiation (3.0 J/cm$^2$) was done for 600 seconds to perform a polymerization treatment. Subsequently, liquid crystal display devices of Examples 133 to 136 were prepared using the color filters 1 to 4 shown in Table 8. The VHR and ID of each liquid crystal display device were determined. Each liquid crystal display device was evaluated in terms of burn-in. Table 60 shows the results.

TABLE 60

|  | Example 133 | Example 134 | Example 135 | Example 136 |
| --- | --- | --- | --- | --- |
| Liquid crystal composition | Liquid crystal composition 34 | Liquid crystal composition 34 | Liquid crystal composition 34 | Liquid crystal composition 34 |
| Color filter | Color filter 1 | Color filter 2 | Color filter 3 | Color filter 4 |
| VHR | 99.3 | 99.3 | 99.4 | 99.5 |
| ID | 64 | 58 | 29 | 22 |
| Burn-in | Excellent | Excellent | Excellent | Excellent |

In the liquid crystal display devices of Examples 133 to 136, a high VHR and a small ID were realized. In the evaluation of burn-in, a residual image was absent. In another case, a residual image was present, but it was very slight and at an acceptable level.

Examples 137 to 140

A liquid crystal composition 35 was prepared by mixing 0.3% by mass of bismethacrylic acid 3-fluorobiphenyl-4,4'-diyl in the liquid crystal composition 32 having negative dielectric anisotropy. The liquid crystal composition 35 was held between the VA cells used in Example 1. While a driving voltage is applied between the electrodes, ultraviolet irradiation (3.0 J/cm$^2$) was done for 600 seconds to perform a polymerization treatment. Subsequently, liquid crystal display devices of Examples 137 to 140 were prepared using the color filters 1 to 4 shown in Table 8. The VHR and ID of each liquid crystal display device were determined. Each liquid crystal display device was evaluated in terms of burn-in. Table 61 shows the results.

TABLE 61

|  | Example 137 | Example 138 | Example 139 | Example 140 |
|---|---|---|---|---|
| Liquid crystal composition | Liquid crystal composition 35 | Liquid crystal composition 35 | Liquid crystal composition 35 | Liquid crystal composition 35 |
| Color filter | Color filter 1 | Color filter 2 | Color filter 3 | Color filter 4 |
| VHR | 98.9 | 99.2 | 99.5 | 99.6 |
| ID | 69 | 62 | 28 | 16 |
| Burn-in | Excellent | Good | Excellent | Excellent |

In the liquid crystal display devices of Examples 137 to 140, a high VHR and a small ID were realized. In the evaluation of burn-in, a residual image was absent. In another case, a residual image was present, but it was very slight and at an acceptable level.

The invention claimed is:

1. A liquid crystal display device comprising a first substrate, a second substrate, a liquid crystal composition layer held between the first substrate and the second substrate, a color filter including a black matrix and an RGB three-color pixel portion, a pixel electrode, and a common electrode,
wherein the liquid crystal composition layer is composed of a liquid crystal composition including one or more compounds selected from a compound group represented by General Formula (LC1) to General Formula (LC4):

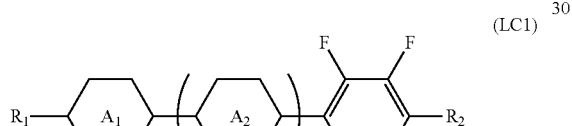
(LC1)

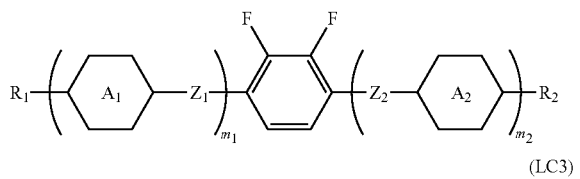
(LC2)

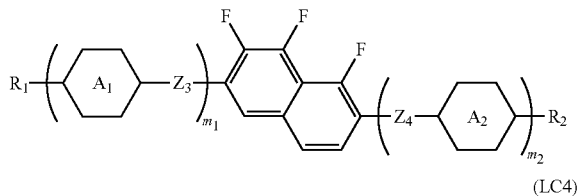
(LC3)

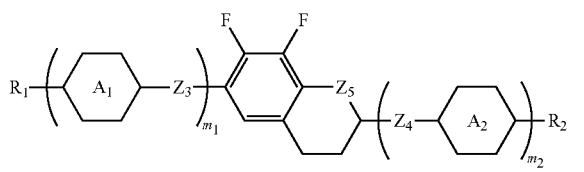
(LC4)

(where $R_1$ and $R_2$ each independently represent an alkyl group having a carbon number of 1 to 15; one or more $CH_2$ groups of the alkyl group may be substituted by —O—, —CH=CH—, —CO—, —OCO—, —COO—, —C≡C—, —$CF_2$O—, or —$OCF_2$— so that an oxygen atom is not directly adjacent to another oxygen atom; one or more hydrogen atoms of the alkyl group may optionally be substituted by a halogen; $A_1$ and $A_2$ each independently represent any one of the following structures:

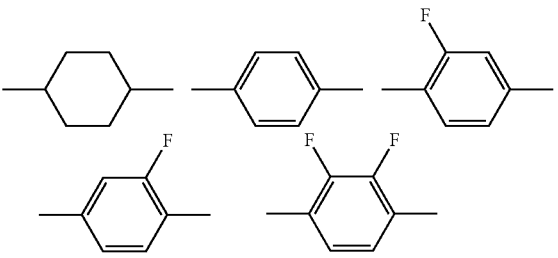

(in these structures, one or more $CH_2$ groups of the cyclohexane ring may be substituted by an oxygen atom, one or more CH groups of the benzene ring may be substituted by a nitrogen atom, and one or more hydrogen atoms may be substituted by F, Cl, $CF_3$, or $OCF_3$); $Z_1$ to $Z_4$ each independently represent a single bond, —CH=CH—, —C≡C—, —$CH_2CH_2$—, —$(CH_2)_4$—, —COO—, —$OCH_2$—, —$CH_2O$—, —$OCF_2$—, or —$CF_2O$—; $Z_5$ represents a $CH_2$ group or an oxygen atom; at least one of $Z_1$ and $Z_2$ is not a single bond; $l_1$ represents 0 or 1; $m_1$ and $m_2$ each independently represent 0 to 3; and $m_1+m_2$ is 1, 2, or 3), and
wherein, in the RGB three-color pixel portion, an R pixel portion includes, as a coloring material, a diketopyrrolopyrrole-based red pigment having an average primary particle size of 5 to 50 nm as measured by small angle X-ray scattering.

2. The liquid crystal display device according to claim 1, wherein, in the RGB three-color pixel portion, a G pixel portion includes, as a coloring material, at least one dye or pigment selected from the group consisting of a halogenated metal phthalocyanine pigment, a phthalocyanine-based green dye, and a mixture of a phthalocyanine-based blue dye and an azo-based yellow organic dye, and a B pixel portion includes, as a coloring material, at least one dye or pigment selected from the group consisting of an ∈-type copper phthalocynian pigment, a triarylmethane pigment, and a cationic blue organic dye.

3. The liquid crystal display device according to claim 1, wherein the R pixel portion includes a pigment derivative.

4. The liquid crystal display device according to claim 1, wherein the R pixel portion includes at least one pigment derivative selected from a quinacridone-based pigment derivative, a diketopyrrolopyrrole-based pigment derivative, an anthraquinone-based pigment derivative, and a thiazine-based pigment derivative.

5. The liquid crystal display device according to claim 1, wherein, in the RGB three-color pixel portion, the G pixel portion includes, as a coloring material, a halogenated metal phthalocyanine pigment including a metal selected from the group consisting of Al, Si, Sc, Ti, V, Mg, Fe, Co, Ni, Zn, Cu, Ga, Ge, Y, Zr, Nb, In, Sn, and Pb as a central metal,
wherein, when the central metal is trivalent, the central metal is bonded to any one of a halogen atom, a hydroxy group, and a sulfonic group or is oxo-cross-linked or thio-cross-linked, and
wherein, when the central metal is a tetravalent metal, the central metal is bonded to any one of an oxygen atom, two identical or different halogen atoms, two hydroxy groups, and two sulfonic groups.

6. The liquid crystal display device according to claim 1, wherein, in the RGB three-color pixel portion, the B pixel portion includes, as a coloring material, a triarylmethane pigment represented by General Formula (1):

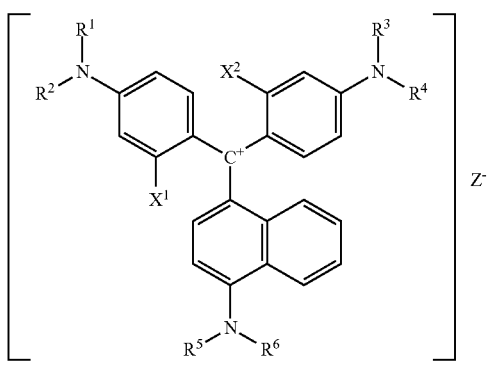

(where $R^1$ to $R^6$ each independently represent a hydrogen atom, an unsubstituted or substituted alkyl group having a carbon number of 1 to 8, or an unsubstituted or substituted aryl group; when $R^1$ to $R^6$ represent an unsubstituted or substituted alkyl group, adjacent $R^1$ and $R^2$, adjacent $R^3$ and $R^4$, and adjacent $R^5$ and $R^6$ may be each bonded to each other to form a ring structure; $X^1$ and $X^2$ each independently represent a hydrogen atom, a halogen atom, or an unsubstituted or substituted alkyl group having a carbon number of 1 to 8; $Z^-$ is at least one anion selected from a heteropolyoxometalate anion represented by $(P_2Mo_yW_{18-y}O_{62})^{6-}/6$ where y is an integer of 0, 1, 2, or 3, a heteropolyoxometalate anion represented by $(SiMoW_{11}O_{40})^{4-}/4$, and a lacunary Dawson-type phosphotungstic acid heteropolyoxometalate anion; and, when one molecule includes a plurality of structures represented by Formula (1), the structures may be identical or different).

7. The liquid crystal display device according to claim 1, wherein, in the RGB three-color pixel portion, the G pixel portion includes, as a coloring material, a mixture of C. I. Solvent Blue 67 and C. I. Solvent Yellow 162, and the B pixel portion includes, as a coloring material, C. I. Solvent Blue 7.

8. The liquid crystal display device according to claim 1, wherein, in the RGB three-color pixel portion, the G pixel portion includes, as a coloring material, one or more pigments selected from C. I. Pigment Green 7, 36, and 58, and the B pixel portion includes, as a coloring material, C. I. Pigment Blue 15:6 and/or a triarylmethane pigment.

9. The liquid crystal display device according to claim 1, wherein the color filter includes the black matrix, the RGB three-color pixel portion, and a Y pixel portion, and wherein the Y pixel portion includes, as a coloring material, at least one yellow organic dye or organic pigment selected from the group consisting of C. I. Pigment Yellow 150, 215, 185, 138, and 139 and C. I. Solvent Yellow 21, 82, 83:1, 33, and 162.

10. The liquid crystal display device according to claim 1, wherein the liquid crystal composition layer is composed of a liquid crystal composition further including one or more compounds represented by General Formula (LC5):

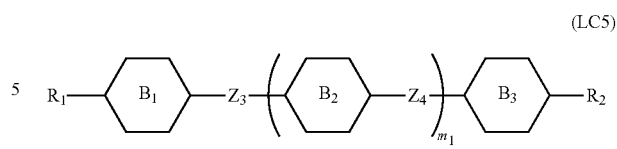

(where $R_1$ and $R_2$ each independently represent an alkyl group having a carbon number of 1 to 15; one or more $CH_2$ groups of the alkyl group may be substituted by —O—, —CH=CH—, —CO—, —OCO—, —COO—, —C≡C—, —CF$_2$O—, or —OCF$_2$— so that an oxygen atom is not directly adjacent to another oxygen atom; one or more hydrogen atoms of the alkyl group may optionally be substituted by a halogen; $B_1$ to $B_3$ each independently represent any one of the following structures:

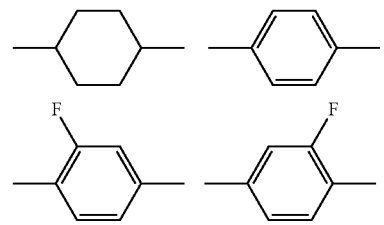

(in these structures, one or more $CH_2CH_2$ groups of the cyclohexane ring may be substituted by —CH=CH—, —CF$_2$O—, or —OCF$_2$— and one or more CH groups of the benzene ring may be substituted by a nitrogen atom); $Z_3$ and $Z_4$ each independently represent a single bond, —CH=CH—, —C≡C—, —CH$_2$CH$_2$—, —(CH$_2$)$_4$—, —COO—, —OCH$_2$—, —CH$_2$O—, —OCF$_2$—, or —CF$_2$O—; at least one of $Z_3$ and $Z_4$ is not a single bond; and $m_1$ represents 0 to 3).

11. The liquid crystal display device according to claim 1, wherein General Formula (LC1) represents one or more compounds selected from a group consisting of compounds represented by General Formula (LC1)-1 to General Formula (LC1)-7:

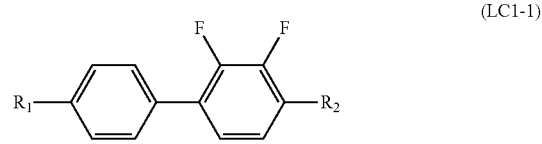

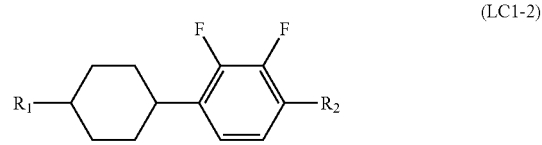

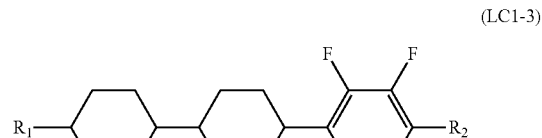

-continued

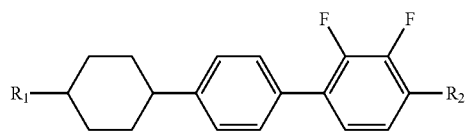
(LC1-4)

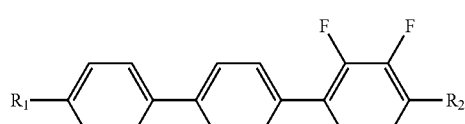
(LC1-5)

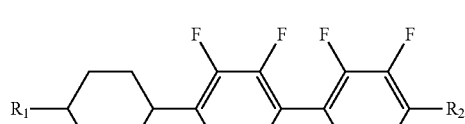
(LC1-6)

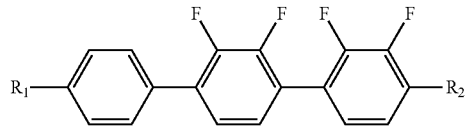
(LC1-7)

(where $R_1$ and $R_2$ each independently represent an alkyl group having a carbon number of 1 to 7, an alkoxy group having a carbon number of 1 to 7, an alkenyl group having a carbon number of 2 to 7, or an alkenyloxy group having a carbon number of 2 to 7).

12. The liquid crystal display device according to claim 1, wherein General Formula (LC2) represents one or more compounds selected from a group consisting of compounds represented by General Formula (LC2)-1 to General Formula (LC2)-15:

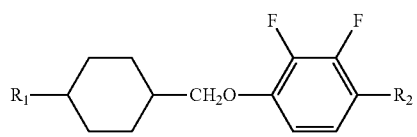
(LC2)-1

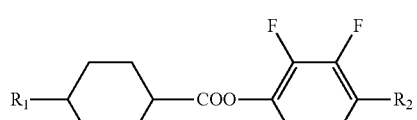
(LC2)-2

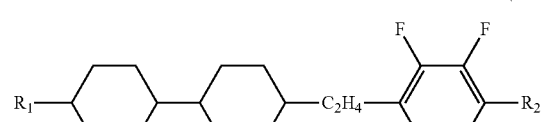
(LC2)-3

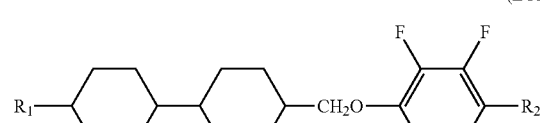
(LC2)-4

-continued

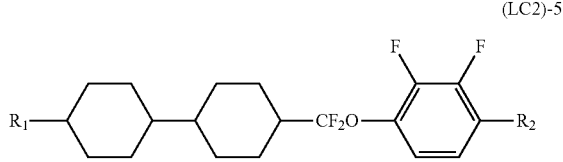
(LC2)-5

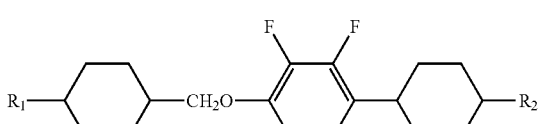
(LC2)-6

(LC2)-7

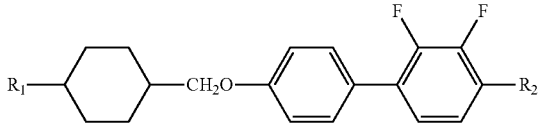
(LC2)-8

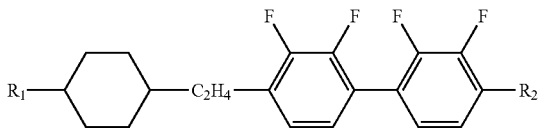
(LC2)-9

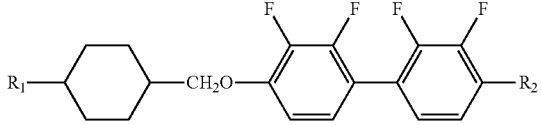
(LC2)-10

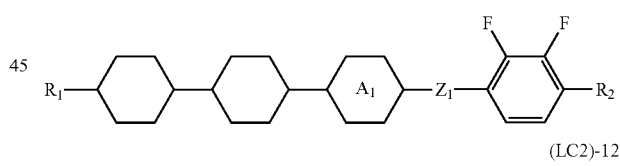
(LC2)-11

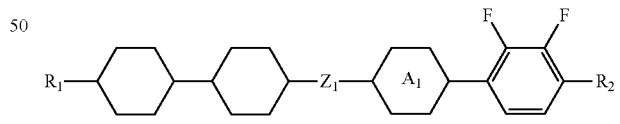
(LC2)-12

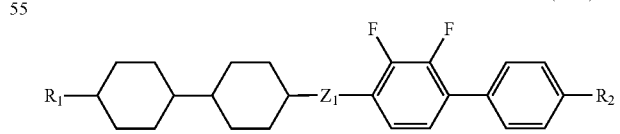
(LC2-14)

(LC2-15)

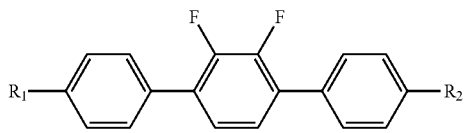

(where $R_1$ and $R_2$ each independently represent an alkyl group having a carbon number of 1 to 7, an alkoxy group having a carbon number of 1 to 7, an alkenyl group having a carbon number of 2 to 7, or an alkenyloxy group having a carbon number of 2 to 7; $Z^1$ represents —CH$_2$CH$_2$—, —OCH$_2$—, —CH$_2$O—, —OCF$_2$—, or —CF$_2$O—; and $A^1$ represents any one of the following structures:

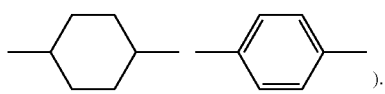

).

13. The liquid crystal display device according to claim 1, wherein General Formula (LC3) represents one or more compounds selected from a group consisting of compounds represented by General Formula (LC3)-1 to General Formula (LC3)-6, and General Formula (LC4) represents one or more compounds selected from a group consisting of compounds represented by General Formula (LC4)-1 to General Formula (LC4)-4:

(LC3)-1

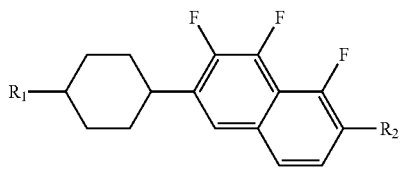

(LC3)-2

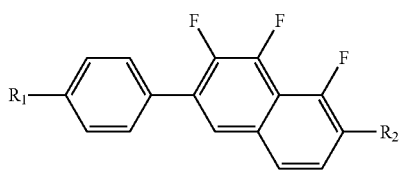

(LC3)-3

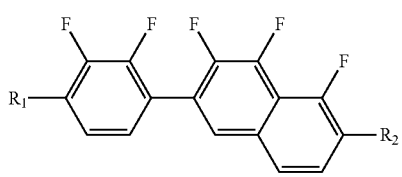

(LC3)-4

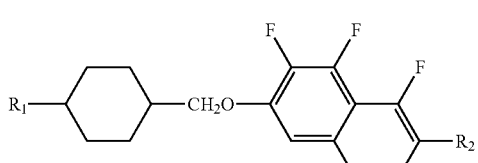

(LC3)-5

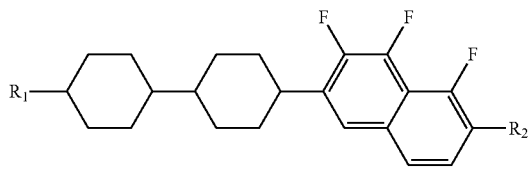

(LC3)-6

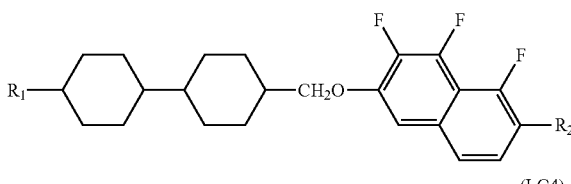

(LC4)-1

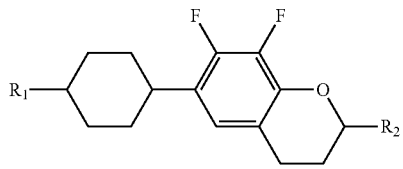

(LC4)-2

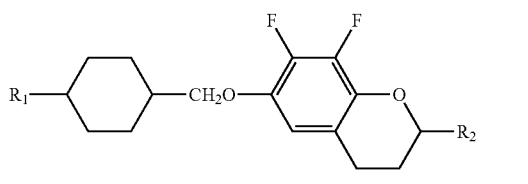

(LC4)-3

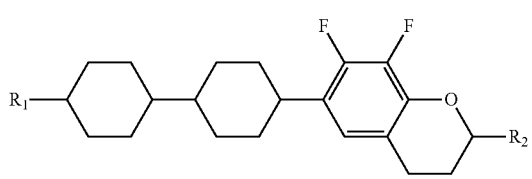

(LC4)-4

(where $R_1$ and $R_2$ each independently represent an alkyl group having a carbon number of 1 to 7, an alkoxy group having a carbon number of 1 to 7, an alkenyl group having a carbon number of 2 to 7, or an alkenyloxy group having a carbon number of 2 to 7).

14. The liquid crystal display device according to claim 10, wherein General Formula (LC5) represents one or more compounds selected from a group consisting of compounds represented by General Formula (LC5)-1 to General Formula (LC5)-13:

(LC5)-1

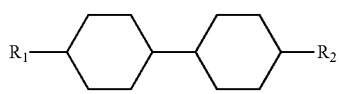

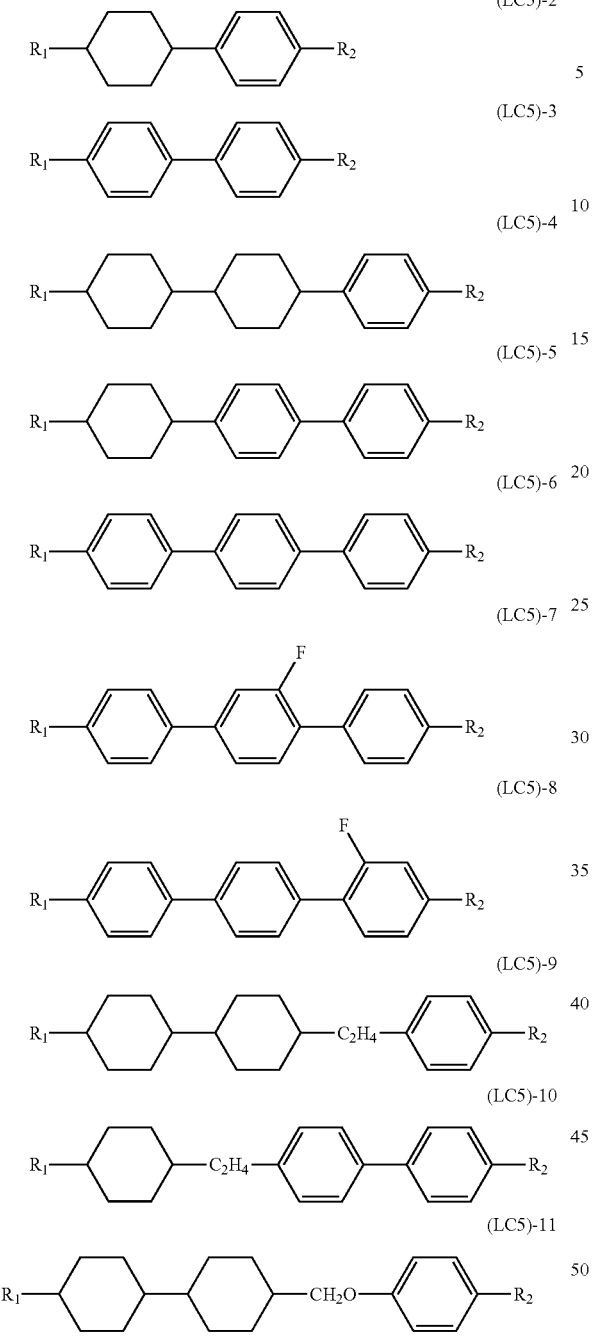

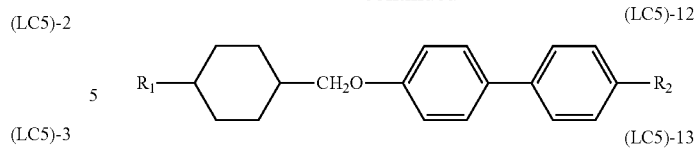

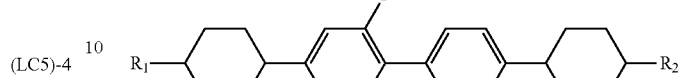

(where $R_1$ and $R_2$ each independently represent an alkyl group having a carbon number of 1 to 7, an alkoxy group having a carbon number of 1 to 7, an alkenyl group having a carbon number of 2 to 7, or an alkenyloxy group having a carbon number of 2 to 7).

15. The liquid crystal display device according to claim 1, wherein the liquid crystal composition layer is a polymer including said one or more compounds selected from the compound group represented by General Formula (LC1) to General Formula (LC4), the polymer formed by polymerizing one or more polymerizable compounds further included in the liquid crystal composition.

16. The liquid crystal display device according to claim 15, wherein the polymerizable compound is represented by General Formula (PC1):

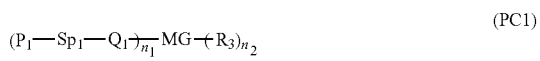

(where $P_1$ represents a polymerizable functional group; $Sp_1$ represents a spacer group having a carbon number of 0 to 20; $Q_1$ represents a single bond, —O—, —NH—, —NHCOO—, —OCONH—, —CH=CH—, —CO—, —COO—, —OCO—, —OCOO—, —OOCO—, —CH=CH—, —CH=CH—COO—, —OCO—CH=CH—, or —C≡C—; $n_1$ and $n_2$ represent 1, 2, or 3; MG represents a mesogenic group or a mesogenic supporting group; $R_3$ represents a halogen atom, a cyano group, or an alkyl group having a carbon number of 1 to 25, and one or more $CH_2$ groups of the alkyl group may be substituted by —O—, —S—, —NH—, —N(CH$_3$)—, —CO—, —COO—, —OCO—, —OCOO—, —SCO—, —COS—, or —C≡C— so that an oxygen atom is not directly adjacent to another oxygen atom; and, in another case, $R_3$ represents $P_2$-$Sp_2$-$Q_2$- (in this formula, $P_2$, $Sp_2$, $Q_2$ independently represent the same things as $P_1$, $Sp_1$, $Q_1$, respectively)).

* * * * *